US008370254B1

(12) United States Patent
Hopkins, III et al.

(10) Patent No.: US 8,370,254 B1
(45) Date of Patent: Feb. 5, 2013

(54) ENHANCED VEHICLE IDENTIFICATION CARD

(75) Inventors: John Chandler Hopkins, III, San Antonio, TX (US); Judy Margaret Cotter, San Antonio, TX (US)

(73) Assignee: United Services Automobile Association, San Antonio, TX (US)

( * ) Notice: Subject to any disclaimer, the term of this patent is extended or adjusted under 35 U.S.C. 154(b) by 0 days.

(21) Appl. No.: 11/861,476

(22) Filed: Sep. 26, 2007

(51) Int. Cl.
*G06Q 40/00* (2012.01)
(52) U.S. Cl. ............................................. 705/39; 705/35
(58) Field of Classification Search ................ 705/4, 40, 705/41; 235/379, 493; 455/558
See application file for complete search history.

(56) References Cited

U.S. PATENT DOCUMENTS

| | | | |
|---|---|---|---|
| 4,718,009 A | 1/1988 | Cuervo | |
| 4,954,985 A | 9/1990 | Yamazaki | 365/108 |
| 5,066,853 A | 11/1991 | Brisson | |
| 5,521,363 A | 5/1996 | Tannenbaum | |
| 5,590,038 A | 12/1996 | Pitroda | |
| 5,777,903 A | 7/1998 | Piosenka et al. | 708/100 |
| 5,789,732 A | 8/1998 | McMahon et al. | |
| 5,878,337 A | 3/1999 | Joao et al. | |
| 5,991,740 A | 11/1999 | Messer | |
| 6,016,954 A | 1/2000 | Abe et al. | 235/379 |
| 6,170,742 B1 | 1/2001 | Yacoob | |
| 6,336,586 B1 | 1/2002 | Shriver | 235/380 |
| 6,592,044 B1 * | 7/2003 | Wong et al. | 235/493 |
| 6,609,114 B1 | 8/2003 | Gressel et al. | |
| 6,905,072 B2 | 6/2005 | Ramachandran | |
| 6,993,505 B1 | 1/2006 | Katz et al. | |
| 7,097,108 B2 | 8/2006 | Zellner et al. | |
| 7,191,952 B2 | 3/2007 | Blossom | 235/492 |
| 7,254,556 B2 | 8/2007 | Fry | |
| 7,349,860 B1 | 3/2008 | Wallach et al. | |
| 8,025,226 B1 | 9/2011 | Hopkins, III et al. | |
| 2001/0044733 A1 | 11/2001 | Lee et al. | |
| 2002/0096561 A1 | 7/2002 | Sullivan | |
| 2002/0109610 A1 | 8/2002 | Katz | |
| 2002/0194118 A1 | 12/2002 | Nassar | |
| 2002/0194120 A1 | 12/2002 | Russell et al. | |
| 2003/0069673 A1 | 4/2003 | Hong et al. | |
| 2003/0074328 A1 | 4/2003 | Schiff et al. | |
| 2003/0163403 A1 | 8/2003 | Chen et al. | |
| 2003/0167218 A1 | 9/2003 | Field et al. | |
| 2003/0191703 A1 | 10/2003 | Chen et al. | |
| 2003/0209362 A1 | 11/2003 | Kasuga et al. | |
| 2003/0233278 A1 | 12/2003 | Marshall | |

(Continued)

OTHER PUBLICATIONS

Accela Communications, Inc., "Visa toys with credit card displays," itworld.com, http://www.itworld.com/Tech/2987/040429visadisplay/pfindex.html, Apr. 29, 2004, downloaded Jul. 11, 2007, 2 pages.

(Continued)

*Primary Examiner* — Samica L Norman
(74) *Attorney, Agent, or Firm* — Schwegman Lundberg Woessner P.A.

(57) ABSTRACT

A vehicle identification card is provided to an insured that includes proof of automotive insurance information and charge account information. The card may include an insurance policy covering the insured's vehicle, the VIN number of the vehicle, and other information about the vehicle such as the vehicle's make and model. The card may include account information that allows the card to be used like a credit card. The card may further include means for wirelessly updating information and providing a display to the user, which includes, but is not limited to, a housing, a memory module, a processor, one or more displays, and a power source.

21 Claims, 25 Drawing Sheets

U.S. PATENT DOCUMENTS

| | | | |
|---|---|---|---|
| 2003/0236747 A1* | 12/2003 | Sager | 705/40 |
| 2004/0215587 A1 | 10/2004 | Bertrand et al. | |
| 2004/0249695 A1 | 12/2004 | Clark et al. | |
| 2004/0255081 A1 | 12/2004 | Arnouse | |
| 2005/0060257 A1 | 3/2005 | Fry | |
| 2005/0099320 A1 | 5/2005 | Nath et al. | |
| 2005/0228700 A1* | 10/2005 | Barcomb | 705/4 |
| 2006/0095304 A1 | 5/2006 | Madison et al. | |
| 2006/0100944 A1 | 5/2006 | Reddin et al. | |
| 2006/0106650 A1* | 5/2006 | Bush | 705/4 |
| 2006/0113376 A1* | 6/2006 | Reed et al. | 235/379 |
| 2007/0073612 A1 | 3/2007 | Smith et al. | |
| 2007/0129972 A1 | 6/2007 | Labelle et al. | |
| 2008/0086632 A1 | 4/2008 | Kagle | |
| 2008/0120245 A1 | 5/2008 | Humphreys et al. | |
| 2009/0024525 A1* | 1/2009 | Blumer et al. | 705/41 |
| 2009/0143104 A1* | 6/2009 | Loh et al. | 455/558 |

OTHER PUBLICATIONS

Anonymous, "News: VISA Experiments with Credit Card Display," Warp2Search.Net, http://www.warp2search.net/modules.php?name=News&file=article&sid=17717, 2003, downloaded Jul. 12, 2007, 3 pages.

Credit Cards.com, "Reward Credit Cards," http://www.creditcards.com/reward.php, 2007, downloaded Apr. 10, 2007, 6 pages.

"Debit card displays balance," *Halfbakery*, http://www.halfbakery.com/idea/Debit_20card_20displays_20balance, 2004, downloaded Jul. 12, 2007, 2 pages.

Equifax, "Equifax Products: Get Triple the Protection with 3-in1 Monitoring," https://www.econsumer.equifax.com/consumer/sitepage.ehtml?forward=products, 2007, downloaded Apr. 10, 2007, 3 pages.

Equifax, "Equifax Credit Watch™ Gold Family Program: Protect Your Family From the Pain of Identity Theft," https://www.econsumer.equifax.com/consumer/sitepage.ehtml?forward=fesng_detail, 2007, downloaded Apr. 10, 2007, 2 pages.

Gemalto: security to be free, "Contactless payment solutions: Convenient and fast payment transactions," http://www.gemalto.com/brochures/download/contactless_payment.pdf, Nov. 2006, downloaded Jul. 11, 2007, 2 pages.

MasterCard Worldwide, "MasterCard® PayPass™," http://www.paypass.com/, downloaded Jul. 11, 2007, 2 pages.

OLED-info.com, "SecureCard credit card," http://www.oled-info.com/design_sketches/securecard_credit_card, Nov. 11, 2006, downloaded Jul. 11, 2007, 1 page.

Stensgaard, A-B., "Biometric breakthrough—credit cards secured with fingerprint recognition made feasible," *AME Info FZ LLC / EMAP Communications*, http://www.ameinfo.com/58236.html, updated Nov. 13, 2006, downloaded Jul. 11, 2007, 3 pages.

Solicore™, "Solicore: Different Down to the Core," http://www.solicore.com/product.html, Feb. 12, 2007, downloaded Jul. 11, 2007, 1-23.

Texas Department of Insurance, "Automobile Insurance Made Easy," http://www.tdi.state.tx.us/consumer/cb020.html, 2006, downloaded Apr. 10, 2007, 14 pages.

U.S. Department of Labor, "Claims Adjusters, Appraisers, Examiners, and Investigators," *Occupational Outlook Handbook*, http://www.bls.gov/oco/ocos125.htm, 2006, downloaded Apr. 10, 2007, 9 pages.

Vacherand, F., "Technological Trends for Smart Card Chips: New Emerging Technologies for Secure Chips and Smart Cards," *Minatec*, Sep. 22-26, 2003, downloaded Jul. 11, 2007, 1-24.

WA State Department of Licensing, "Mandatory insurance," http://www.dol.wa.gov/driverslicense/insurance.html, 2007, downloaded Apr. 10, 2007, 2 pages.

"U.S. Appl. No. 11/375,339, Non Final Office Action mailed Jun. 24, 2009", 18 pgs.

"U.S. Appl. No. 11/735,345, Examiner Interview Summary mailed Jan. 29, 2009", 2 pgs.

"U.S. Appl. No. 11/735,345, Non Final Office Action mailed Oct. 2, 2008", 9 pgs.

"U.S. Appl. No. 11/735,345, Response filed Mar. 2, 2009 to Non Final Office Action mailed Oct. 2, 2008", 13 pgs.

"U.S. Appl. No. 11/735,345, Restriction Requirement mailed Jun. 24, 2009", 6 pgs.

"U.S. Appl. No. 11/861,443, Final Office Action mailed Mar. 16, 2010", 17 pgs.

"U.S. Appl. No. 11/861,443, Response filed Dec. 29, 2009 to Non Final Office Action mailed Sep. 9, 2009", 9 pgs.

"U.S. Appl. No. 11/735,325, Non Final Office Action mailed Jun. 24, 2009", 8 pgs.

"U.S. Appl. No. 11/735,325, Response filed Dec. 23, 2009 to Non Final Office Action mailed Jun. 24, 2009", 9 pgs.

"U.S. Appl. No. 11/861,443, Final Office Action mailed Jun. 10, 2009", 12 pgs.

"U.S. Appl. No. 11/861,443, Non Final Office Action mailed Jan. 13, 2009", 10 pgs.

"U.S. Appl. No. 11/861,443, Non Final Office Action mailed Sep. 29, 2009", 13 pgs.

"U.S. Appl. No. 11/861,443, Response filed Apr. 10, 2009 to Non Final Office Action mailed Jan. 13, 2009", 10 pgs.

"U.S. Appl. No. 11/861,443, Response filed Sep. 10, 2009 to Final Office Action mailed Jun. 10, 2009", 11 pgs.

"U.S. Appl. No. 11/861,443, Response filed Dec. 29, 2009 to Non Final Office Action mailed Sep. 29, 2009", 10 pgs.

"Motor Vehicle Liability Insurance Coverage Owner(s) Responsibilities", *Georgia Department of Revenue, Motor Vehicle Division*, [Online]. [Archived Dec. 17, 2008] Retrieved from the Internet: <URL: http://web.archive.org/web/20060430063730/http://motor.etax.dor.ga.gov/motor/insurance/insurancereq.asp>, 4 pgs.

U.S. Appl. No. 11/735,325, Final Office Action mailed Apr. 6, 2010, 8 pgs.

U.S. Appl. No. 11/735,325, Response filed Jul. 6, 2010 to Final Office Action mailed Apr. 6, 2010, 8 pgs.

U.S. Appl. No. 11/861,443, Response filed Jun. 16, 2010 to Final Office Action mailed Mar. 16, 2010, 10 pgs.

U.S. Appl. No. 11/861,460, Non-Final Office Action mailed Aug. 19, 2010, 6 pgs.

U.S. Appl. No. 11/861,497, Non-Final Office Action mailed Jul. 14, 2010, 7 pgs.

U.S. Appl. No. 11/735,325, Non Final Office Action mailed Oct. 12, 2011, 11 pgs.

U.S. Appl. No. 11/861,443, Final Office Action mailed May 26, 2011, 18 pgs.

U.S. Appl. No. 11/861,443, Non Final Office Action mailed Nov. 26, 2010, 16 pgs.

U.S. Appl. No. 11/861,443, Response filed Feb. 28, 2011 to Non Final Office Action mailed Nov. 26, 2010, 11 pgs.

U.S. Appl. No. 11/861,460, Final Office Action mailed Mar. 25, 2011, 8 pgs.

U.S. Appl. No. 11/861,460, Response filed Jan. 19, 2011 to Non Final Office Action mailed Aug. 19, 2010, 11 pgs.

U.S. Appl. No. 11/861,484, Non Final Office Action mailed Nov. 29, 2010, 7 pgs.

U.S. Appl. No. 11/861,484, Notice of Allowance mailed May 11, 2011, 7 pgs.

U.S. Appl. No. 11/861,484, Notice of Allowance mailed Aug. 5, 2011, 7 pgs.

U.S. Appl. No. 11/861,484, Response filed Feb. 28, 2011 to Non Final Office Action mailed Nov. 29, 2010, 9 pgs.

* cited by examiner

210

| | |
|---|---|
| Account number | 5422 3800 0000 0000 |
| Credit Limit | $20,000.00 |
| Secure ACL | $2400.00 |
| Available Credit | $20,000.00 |

Questions? Lost or Stolen Cards?
    Call Customer Service    1-800-531-9111
    in San Antonio    210-498-8111
    Overseas collect    210-491-9111
Or write us at:
P.O. Box 00000, San Antonio, TX 78288
Remit Payment to:
    9800 FREDRICKSBURG ROAD
    SAN ANTONIO, TX 78288

| | |
|---|---|
| Statement closing date | 01/01/2006 |
| Credit Transactions | |
| Previous balance | $300.00 |
| Payments | $200.00 |
| Purchases and Debits | $150.00 |
| TOTAL FINANCE CHARGES | 0.00 |
| New balance | $150.00 |
| Minimum payment due | $0.00 |
| Payment due date | 01/30/2006 |
| Insurance Transactions | |
| Secure ACL Balance | $2400.00 |
| Funds Available for payment | $0.00 |
| Claims balance | $2400.00 |

TO AVOID ADDITIONAL FINANCE CHARGES ON PURCHASES, PAY YOUR ENTIRE NEW BALANCES EVEN IF YOU EXPECT TO RECEIVE A CREDIT, BY THE DUE DATE SHOWN ABOVE.

Transactions

| Trans | Post | Card | Reference Number | Description | Amount |
|---|---|---|---|---|---|
| Insurance Transactions: | | | | | |
| 12/03 | 12/03 | | StarsID12345 | ACME AUTO: Collision Estimate | $2500.00 |
| 12/03 | 12/03 | | ACMERENTALIDXX | ACME RENTAL: 2 Weeks Taurus Rental | 250.00 |
| 12/05 | 12/05 | | AuditID222 | STARS AUDIT ADJUSTMENT | -350.00 |
| 12/07 | 12/07 | | USAA | USAA Claim disbursement to Secure ACL | $2400.00 |
| Credit Transactions: | | | | | |
| 12/01 | 12/03 | M | 5544522QW8XYZNSBBX | StarsPartner: Discount Tires | 400.00 |
| 12/15 | 12/15 | M | 0578511QK4ODFESBVV | Valero #222 - gasoline | 30.00 |
| 12/22 | 12/25 | M | 5545123QV8HDRNSLZX | StarsPartner: Valvoline Oil Change | 25.00 |
| | | | | Total | $470.00 |

207
206
208

SERVICE REMINDERS
Manufacture recommends having transmission fluid changed
Manufacture recommends having brakes serviced.

RECALL NOTICE
MANUFACTURE HAS ISSUED A RECALL OF YOUR VEHICLES WINDSHIELD WIPER SENSOR

GAS REWARDS PROGRAM
BALANCE    0.00

FIG. 4B

ENHANCED VEHICLE IDENTIFICATION CARD

CROSS-REFERENCES

The subject matter described in this application is related to subject matter disclosed in the following commonly assigned applications: U.S. patent application Ser. No. 11/861,443, filed on even date herewith, entitled "Enhanced Vehicle Identification Card"; U.S. patent application Ser. No. 11/861,460, filed on even date herewith, entitled "Enhanced Vehicle Identification Card"; U.S. patent application Ser. No. 11/861,484, filed on even date herewith, entitled "Enhanced Vehicle Identification Card"; and U.S. patent application Ser. No. 11/861,497, filed on even date herewith, entitled "Enhanced Vehicle Identification Card." The contents of each of the above-referenced U.S. patent applications are herein incorporated by reference in their entirety.

The subject matter described in this application is related to subject matter disclosed in the following commonly assigned applications: U.S. patent application Ser. No. 11/735,325, filed Apr. 13, 2007, entitled "Proof of Insurance Vehicle identification card"; U.S. patent application Ser. No. 11/735,339, filed Apr. 13, 2007, entitled "Proof of Insurance Vehicle identification card"; and U.S. patent application Ser. No. 11/735,345, filed Apr. 13, 2007, entitled "Proof of Insurance Vehicle identification card." The contents of each of the above-referenced U.S. patent applications are herein incorporated by reference in their entirety.

The subject matter described in this application is related to subject matter disclosed in the following commonly assigned applications: U.S. patent application Ser. No. 11/829,835, filed Jul. 27, 2007, entitled "System and Methods Related To An Available Balance Debit/Credit Card"; U.S. patent application Ser. No. 11/829,838, filed Jul. 27, 2007, entitled "System and Methods Related To An Available Balance Debit/Credit Card"; and U.S. patent application Ser. No. 11/829,842, filed Jul. 27, 2007, entitled "System and Methods Related To An Available Balance Debit/Credit Card." The contents of each of the above-referenced U.S. patent applications are herein incorporated by reference in their entirety.

COPYRIGHT NOTICE AND PERMISSION

A portion of the disclosure of this patent document may contain material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice shall apply to this document: Copyright© 2007, USAA.

BACKGROUND

Consumers are often in need of account and other information regarding their various debit/credit cards. This may include items such as account status, available balance and other information. Currently, card holders either call or log on to their account over the internet to get the desired information regarding their account. Also, financial institutions and card issuers are in constant searches for new and effective ways to get relevant information to their card holders such as offers for new products and other marketing information that may be of interest to particular customers. Currently, the main forms of communication between the card holders and the financial institutions is by phone, mail, or internet. These methods are often inconvenient and costly for both the financial institution and card holder.

An automobile insurance policy is an important account for many consumers. Policy payments are required year-round which policy owners must maintain to avoid lapses in coverage. Furthermore, proof of insurance is an important and frequently legally required vehicle identification card that policy owners must have on hand. However, such proof of insurance vehicle identification cards typically expire on a regular basis and policy owners must constantly update their vehicle identification cards to remain current. Finally, many of the problems outlined above for debit/credit cards are applicable to automobile insurance vehicle identification cards. Policy owners frequently need to reference their policy coverage limits or, in the case of a claim, must monitor the amount of an approved claim as repairs and other services are managed.

Automobile insurance providers must continuously find ways to re-engineer business processes to accommodate the demand for a low maintenance and low overhead business model. Furthermore, customers today prefer value and ease of use over loyalty, thus systems and methods that work cohesively to provide a superior insurance product to customers while reducing overhead are needed.

SUMMARY

In various embodiments of the present disclosure, a vehicle identification card is provided, e.g. to an insured, that includes proof of automotive insurance information and charge account information. The vehicle identification card may include an insurance policy covering the insured's vehicle, the VIN number of the vehicle, and other information about the vehicle such as the vehicle's make and model. The vehicle identification card may include account information that allows the vehicle identification card to be used like a credit card.

In another embodiment, a wirelessly updated vehicle identification card is provided, which includes, but is not limited to, a housing; a memory module integrated with the housing; a processor coupled to the memory module; one or more displays integrated with the housing operably coupled to the processor; a transceiver integrated with the housing configured to wirelessly receive account information from a remote device over a cellular network; and a power source integrated with the housing operably coupled to the memory module, the processor, the transceiver, and the one or more displays.

In further embodiments, a system is provided that can monitor the transactions utilized by the vehicle identification card in order to create indicators for the insured, such as messages that can be viewed on the card's display while the insured is checking their account. The indicators can be notifications or advertisements related to the purchases the insured makes or related to the vehicle the insured owns. Some of the displays can include coupons for the insured for maintaining their vehicle. A history of vehicle related transactions can be created and can be downloaded by the insured, a company, or a person who wants to purchase the vehicle.

The system may also include an additional credit line that can be used to make vehicle related purchases. The credit line may be utilized by an agent of the insurance company. If the user is in an accident they can call their insurance agent, for example. The agent can gather the facts surrounding the accident and determine how much money the insurance company will give the insured to fix their vehicle. This money can be placed in the account of the user as an additional credit line or as a credit to the account of the insured. The insured may then fix their vehicle and utilize the credit line or the additional credit to pay for the repairs to their vehicle. The system may release the funds under certain conditions, for example, the system may only release the funds to a certain company, for a certain repair, or if the user is satisfied with the repairs. All of the above accounts may be viewed on the vehicle identification card.

It can be appreciated by one of skill in the art that one or more various aspects of the disclosure may include, but are not limited to, circuitry and/or programming for effecting the herein-referenced aspects; the circuitry and/or programming can be virtually any combination of hardware, software, and/or firmware configured to effect the herein-referenced aspects depending upon the design choices of the system designer. In addition to the foregoing, other aspects are described in the claims, drawings, and text forming a part of the present application.

The foregoing is a summary and thus contains, by necessity, simplifications, generalizations and omissions of detail. Those skilled in the art will appreciate that the summary is illustrative only and is not intended to be in any way limiting.

BRIEF DESCRIPTION OF THE DRAWINGS

FIG. 4B illustrates a blown-up example webpage that may be generated by the system of FIG. 3.

DETAILED DESCRIPTION OF ILLUSTRATIVE EMBODIMENTS

Example Computing Devices and Environment

Figure 1:
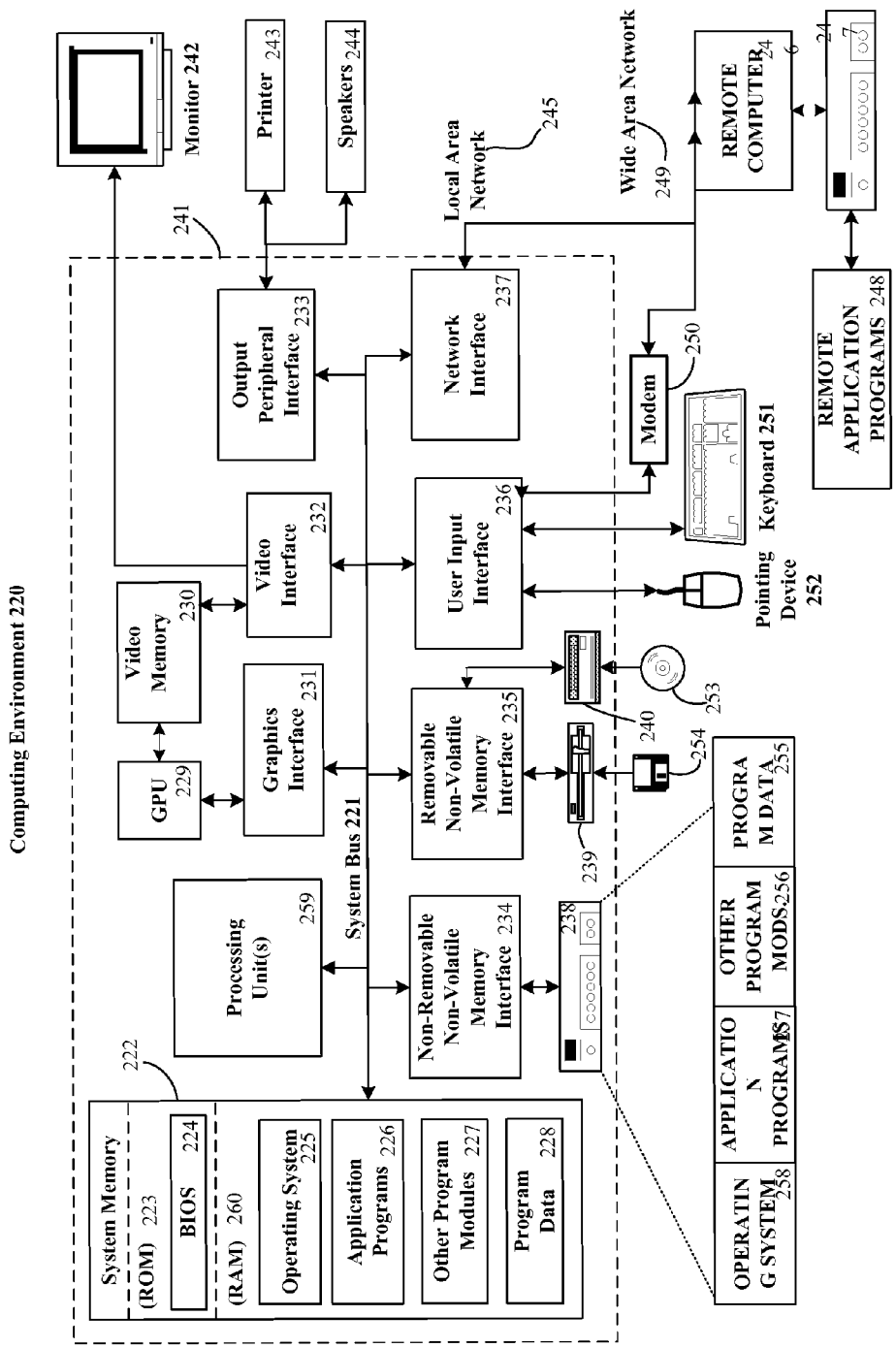
FIG. 1 is a block diagram representing an exemplary computing device suitable for use in conjunction with providing a system with which the wirelessly updated vehicle identification card can communicate and receive updates.

Referring to FIG. 1, shown is a block diagram representing an exemplary computing device suitable for use in conjunction with providing a system with which a wirelessly updated vehicle identification card can communicate and receive updates. For example, the computer executable instructions that carry out the processes and methods to communicate updates to a wirelessly updated vehicle identification card may reside and/or be executed in such a computing environment as shown in FIG. 1. The computing system environment 220 is only one example of a suitable computing environment and is not intended to suggest any limitation as to the scope of use or functionality of the disclosed technology. Neither should the computing environment 220 be interpreted as having any dependency or requirement relating to any one or combination of components illustrated in the exemplary operating environment 220.

Aspects of the disclosed technology are operational with numerous other general purpose or special purpose computing system environments or configurations. Examples of well known computing systems, environments, and/or configurations that may be suitable for use with the disclosed technology include, but are not limited to, personal computers (PCs), server computers, hand-held or laptop devices, multiprocessor systems, microprocessor-based systems, set-top boxes, programmable consumer electronics, network PCs, minicomputers, mainframe computers, distributed computing environments that include any of the above systems or devices, and the like.

Aspects of the disclosed technology may be implemented in the general context of computer-executable instructions, such as program modules, being executed by a computer. Generally, program modules include routines, programs, objects, components, data structures, etc. that perform particular tasks or implement particular abstract data types.

Aspects of the disclosed technology may also be practiced in distributed computing environments where tasks are performed by remote processing devices that are linked through a communications network. In a distributed computing environment, program modules may be located in both local and remote computer storage media including memory storage devices.

An exemplary system for implementing aspects of the disclosed technology includes a general purpose computing device in the form of a computer 241. Components of computer 241 may include, but are not limited to, a processing unit 259, a system memory 222, and a system bus 221 that couples various system components including the system memory to the processing unit 259. The system bus 221 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, the Peripheral Component Interconnect (PCI) bus also known as Mezzanine bus, as well as its successor, the PCI-Express standard. In some embodiments, the exemplary system may additionally include a graphics interface 231 that renders graphics, video memory 230 that can be used to cache graphics, and a GPU 229 that executes the instructions to render graphics.

Computer 241 typically includes a variety of computer readable media. Computer readable media can be any available media that can be accessed by computer 241 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 241. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, long and short range radio frequency (RF), infrared, and other wireless media. Combinations of any of the above should also be included within the scope of computer readable media.

The system memory 222 includes computer storage media in the form of volatile and/or nonvolatile memory such as read only memory (ROM) 223 and random access memory (RAM) 260. A basic input/output system 224 (BIOS), containing the basic routines that help to transfer information between elements within computer 241, such as during start-up, is typically stored in ROM 223. RAM 260 typically contains data and/or program modules that are immediately accessible to and/or presently being operated on by processing unit 259. By way of example, and not limitation, FIG. 1 illustrates operating system 225, application programs 226, other program modules 227, and program data 228.

The computer 241 may also include other removable/non-removable, volatile/nonvolatile computer storage media. By way of example only, FIG. 1 illustrates a hard disk drive 238 that reads from or writes to non-removable, nonvolatile magnetic media, a magnetic disk drive 239 that reads from or writes to a removable, nonvolatile magnetic disk 254, and an optical disk drive 240 that reads from or writes to a removable, nonvolatile optical disk 253 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 238 is typically connected to the system bus 221 through an non-removable memory interface such as interface 234, and magnetic disk drive 239 and optical disk drive 240 are typically connected to the system bus 221 by a removable memory interface, such as interface 235.

The drives and their associated computer storage media discussed above, and illustrated in FIG. 1, provide storage of computer readable instructions, data structures, program modules and other data for the computer 241. In FIG. 1, for example, hard disk drive 238 is illustrated as storing operating system 258, application programs 257, other program modules 256, and program data 255. Note that these components can either be the same as or different from operating system 225, application programs 226, other program modules 227, and program data 228. Operating system 258, application programs 257, other program modules 256, and program data 255 are given different numbers here to illustrate that, at a minimum, they are different copies. A user may enter commands and information into the computer 241 through input devices such as a keyboard 251 and pointing device 252, commonly referred to as a mouse, trackball or touch pad. Other input devices (not shown) may include a microphone, joystick, game pad, satellite dish, scanner, or the like. These and other input devices are often connected to the processing unit 259 through a user input interface 236 that is coupled to the system bus, but may be connected by other interface and bus structures, such as a parallel port, game port or a universal serial bus (USB). A monitor 242 or other type of display device is also connected to the system bus 221 via an interface, such as an insecure or secure video interface 232. An exemplary secure video standard would be the High-Definition Multimedia Interface (HDMI) standard. In addition to the monitor, computers may also include other peripheral output devices such as speakers 244 and printer 243, which may be connected through a output peripheral interface 233.

The computer 241 may operate in a networked environment using logical connections to one or more remote computers, such as a remote computer 246. The remote computer 246 may be a personal computer, a server, a router, a network PC, a peer device or other common network node, and typically includes many or all of the elements described above relative to the computer 241, although only a memory storage device 247 has been illustrated in FIG. 1. The logical connections depicted in FIG. 1 include a local area network (LAN) 245 and a wide area network (WAN) 249, but may also include other networks. Such networking environments are commonplace in offices, enterprise-wide computer networks, intranets and the Internet.

When used in a LAN networking environment, the computer 241 is connected to the LAN 245 through a network interface or adapter 237. When used in a WAN networking environment, the computer 241 typically includes a modem 250 or other means for establishing communications over the WAN 249, such as the Internet. The modem 250, which may be internal or external, may be connected to the system bus 221 via the user input interface 236, or other appropriate mechanism. In a networked environment, program modules depicted relative to the computer 241, or portions thereof, may be stored in the remote memory storage device. By way of example, and not limitation, FIG. 1 illustrates remote application programs 248 as residing on memory device 247. It will be appreciated that the network connections shown are exemplary and other means of establishing a communications link between the computers may be used.

It should be understood that the various techniques described herein may be implemented in connection with hardware or software or, where appropriate, with a combination of both. Thus, the methods and apparatus of the disclosure, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the disclosure. In the case of program code execution on programmable computers, the computing device generally includes a processor, a storage medium readable by the processor (including volatile and non-volatile memory and/or storage elements), at least one input device, and at least one output device. One or more programs that may implement or utilize the processes described in connection with the disclosed technology, e.g., through the use of an API, reusable controls, or the like. Such programs are preferably implemented in a high level procedural or object oriented programming language to communicate with a computer system. However, the program(s) can be implemented in assembly or machine language, if desired. In any case, the language may be a compiled or interpreted language, and combined with hardware implementations.

Although exemplary embodiments may refer to utilizing aspects of the disclosure in the context of one or more standalone computer systems, the disclosure is not so limited, but rather may be implemented in connection with any computing environment, such as a network or distributed computing environment. Still further, aspects of the disclosure may be implemented in or across a plurality of processing chips or devices, and storage may similarly be effected across a plurality of devices. Such devices might include personal computers, network servers, handheld devices, supercomputers, or computers integrated into other systems such as automobiles and airplanes.

In light of the diverse computing environments that may be built according to the general framework provided in FIG. 1, the systems and methods provided herein cannot be construed as limited in any way to a particular computing architecture. Instead, the invention should not be limited to any single embodiment, but rather should be construed in breadth and scope in accordance with the appended claims.

Figure 2:
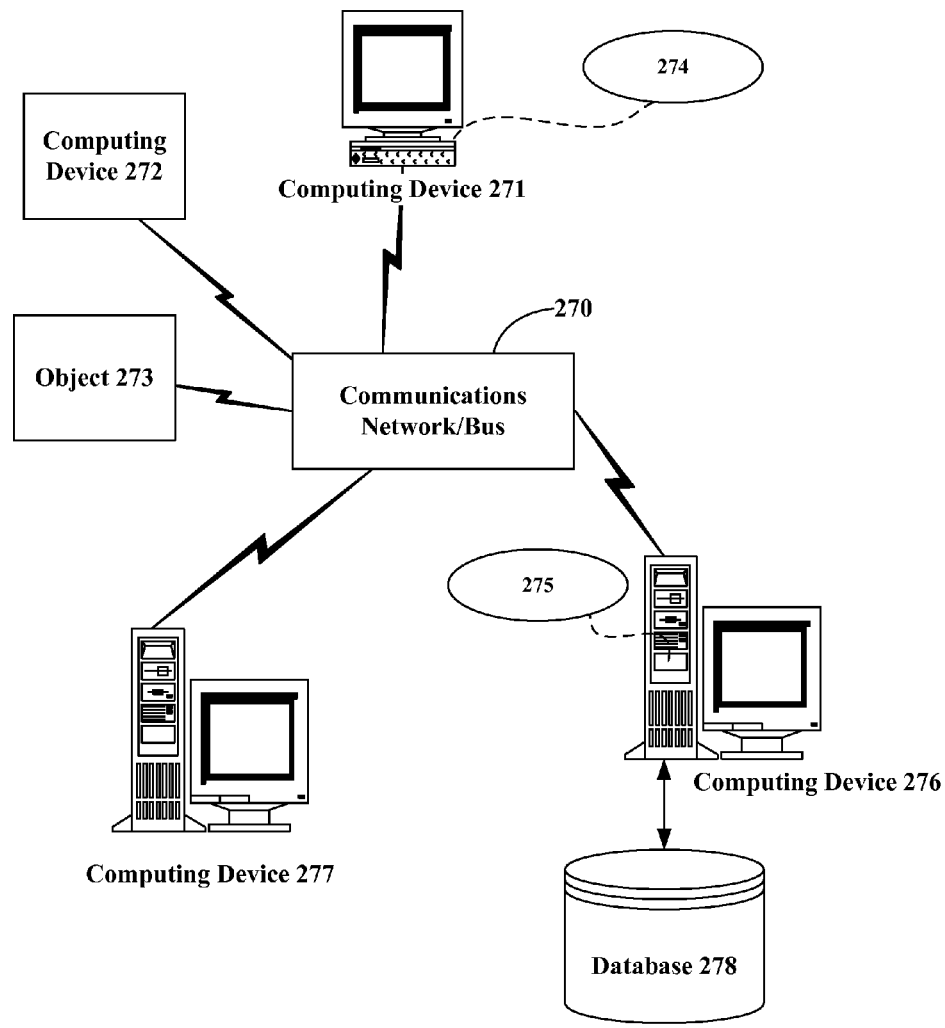
FIG. 2 illustrates an exemplary networked computing environment of which the wirelessly updated vehicle identification card may be a part and in which many computerized processes may be implemented to provide updates to the wirelessly updated vehicle identification card.

Referring next to FIG. 2, shown is an exemplary networked computing environment of which the wirelessly updated vehicle identification card may be a part of, and in which many computerized processes may be implemented to provide updates to the wirelessly updated vehicle identification card. For example, object 273 may represent a wirelessly updated vehicle identification card as one of the various clients on the network of FIG. 2 using and/or implementing systems that provide the means of communication between various clients and servers on the network. In this regard, any computer system or environment having any number of processing, memory, or storage units, and any number of applications and processes occurring simultaneously, is considered suitable for use in connection with the systems and methods provided.

Distributed computing provides sharing of computer resources and services by exchange between computing devices and systems. These resources and services include the exchange of information, cache storage and disk storage for files. Distributed computing takes advantage of network connectivity, allowing clients to leverage their collective power to benefit the entire enterprise. In this regard, a variety of devices may have applications, objects or resources that may implicate the processes described herein.

FIG. 2 provides a schematic diagram of an exemplary networked or distributed computing environment. The environment comprises computing devices 271, 272, 276, and 277 as well as objects 273, 274, and 275, and database 278. Each of these entities 271, 272, 273, 274, 275, 276, 277 and 278 may comprise or make use of programs, methods, data stores, programmable logic, etc. The entities 271, 272, 273, 274, 275, 276, 277 and 278 may span portions of the same or different devices such as PDAs, audio/video devices, music players, personal computers, etc. Each entity 271, 272, 273, 274, 275, 276, 277 and 278 can communicate with another entity 271, 272, 273, 274, 275, 276, 277 and 278 by way of the communications network 270. In this regard, any entity may be responsible for the maintenance and updating of a database 278 or other storage element.

This network 270 may itself comprise other computing entities that provide services to the system of FIG. 2, and may itself represent multiple interconnected networks. In accordance with an aspect of the disclosure, each entity 271, 272, 273, 274, 275, 276, 277 and 278 may contain discrete functional program modules that might make use of an API, or other object, software, firmware and/or hardware, to request services of one or more of the other entities 271, 272, 273, 274, 275, 276, 277 and 278.

It can also be appreciated that an object, such as 275, may be hosted on another computing device 276. Thus, although the physical environment depicted may show the connected devices as computers, such illustration is merely exemplary and the physical environment may alternatively be depicted or described comprising various digital devices such as PDAs, televisions, MP3 players, etc., software objects such as interfaces, COM objects and the like.

There are a variety of systems, components, and network configurations that support distributed computing environments. For example, computing systems may be connected together by wired or wireless systems, by local networks or widely distributed networks. Currently, many networks are coupled to the Internet, which provides an infrastructure for widely distributed computing and encompasses many different networks. Any such infrastructures, whether coupled to the Internet or not, may be used in conjunction with the systems and methods provided.

A network infrastructure may enable a host of network topologies such as client/server, peer-to-peer, or hybrid architectures. The "client" is a member of a class or group that uses the services of another class or group to which it is not related. In computing, a client is a process, i.e., roughly a set of instructions or tasks, that requests a service provided by another program. The client process utilizes the requested service without having to "know" any working details about the other program or the service itself. In a client/server architecture, particularly a networked system, a client is usually a computer that accesses shared network resources provided by another computer, e.g., a server. In the example of FIG. 2, any entity 271, 272, 273, 274, 275, 276, 277 and 278 can be considered a client, a server, or both, depending on the circumstances.

A server is typically, though not necessarily, a remote computer system accessible over a remote or local network, such as the Internet. The client process may be active in a first computer system, and the server process may be active in a second computer system, communicating with one another over a communications medium, thus providing distributed functionality and allowing multiple clients to take advantage of the information-gathering capabilities of the server. Any software objects may be distributed across multiple computing devices or objects.

Client(s) and server(s) communicate with one another utilizing the functionality provided by protocol layer(s). For example, HyperText Transfer Protocol (HTTP) is a common protocol that is used in conjunction with the World Wide Web (WWW), or "the Web." Typically, a computer network address such as an Internet Protocol (IP) address or other reference such as a Universal Resource Locator (URL) can be used to identify the server or client computers to each other. The network address can be referred to as a URL address. Communication can be provided over a communications medium, e.g., client(s) and server(s) may be coupled to one another via TCP/IP connection(s) for high-capacity communication.

In light of the diverse computing environments that may be built according to the general framework provided in FIG. 2 and the further diversification that can occur in computing in a network environment such as that of FIG. 2, the systems and methods provided herein cannot be construed as limited in any way to a particular computing architecture or operating system. Instead, the disclosure should not be limited to any single embodiment, but rather should be construed in breadth and scope in accordance with the appended claims.

Proof of Insurance Vehicle Identification Card

In various embodiments of the present disclosure, a proof of insurance credit card solution is described wherein the features of a vehicle identification card are further combined with the advantages of display and wireless updating capabilities as defined further below. In some embodiments, qualifying members purchasing a new vehicle can enroll in a proof of insurance credit card program. In one such embodiment, the member receives a credit card that is issued to the VIN number of the purchased vehicle and can thus be used to make purchases and to provide proof of insurance. This integration of services provides unique business opportunities to the issuer of the card.

In various embodiments, the credit card portion of the proof of insurance vehicle identification card may be integrated with a separate fund that can be tapped into in order to pay for repairs or other expenses related to the vehicle or in the event of an accident or other claim such as burglary or non-accident related damage (e.g., vandalism). This secured fund can be controlled by the provider, thus allowing the provider to earmark money for certain repairs or expenses, or for certain companies to perform the repairs. Additionally, the provider of the vehicle identification card is in a position to monitor credit transactions of the insured and is able to provide them with information related to the transactions, the vehicle, or rewards for taking care of their vehicle.

The provider is also in a position to integrate services and provide a member with one web page that includes information from multiple sources. The provider can create a web page that allows users to receive information about their insurance policy, their credit transactions, rewards they may have earned, and vehicle based notifications.

Figure 3:
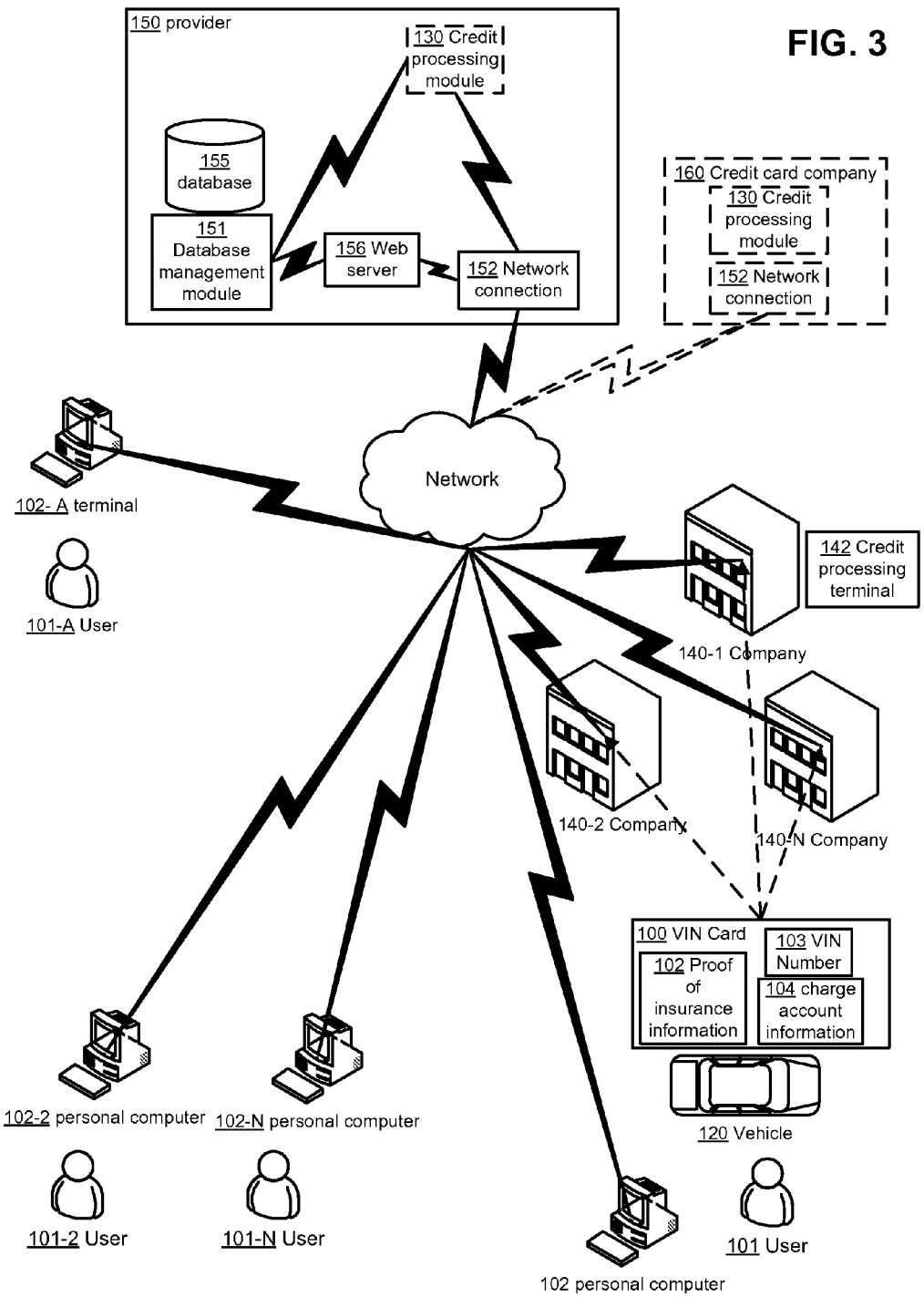
FIG. 3 is a diagram of an example system wherein proof of insurance card techniques may be implemented.
Figure 4A:
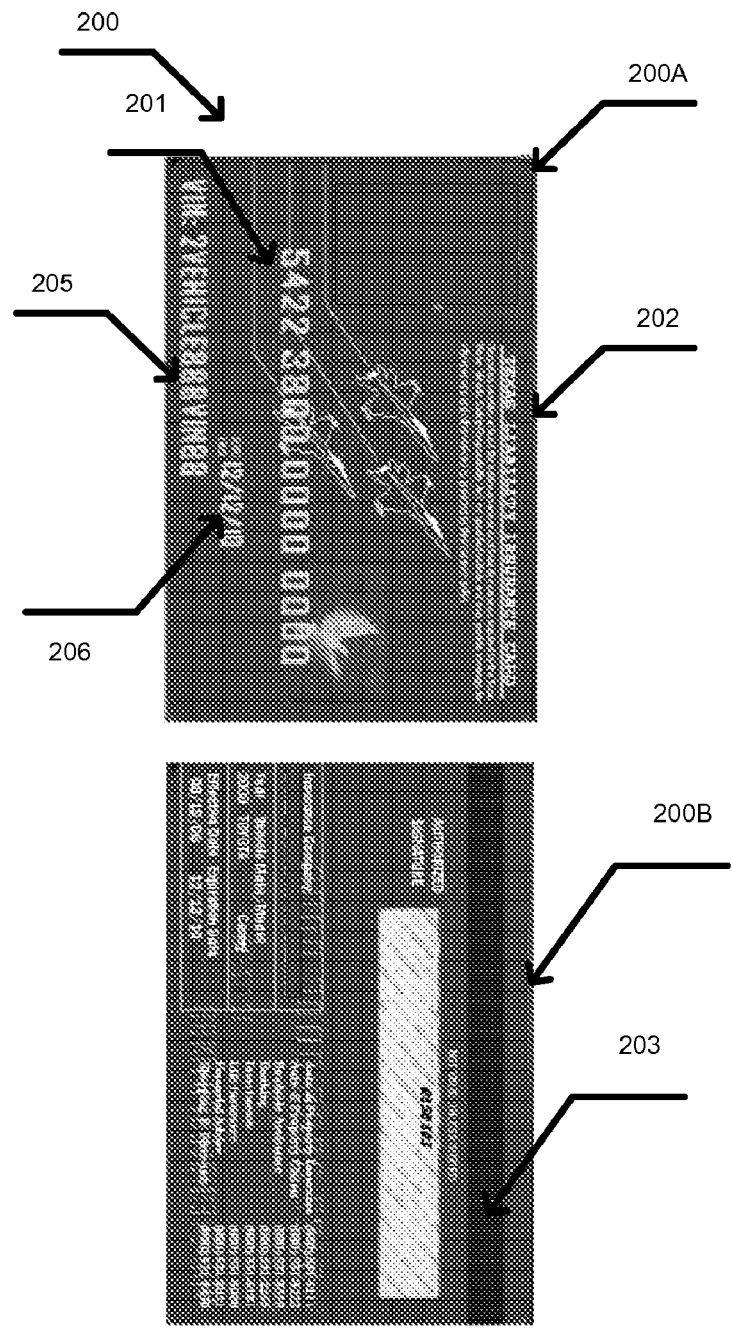
FIG. 4A illustrates a blown-up example vehicle identification card that may be utilized in the system of FIG. 3.

FIG. 3 is a block diagram of an example system in which aspects of the present disclosure may be embodied. FIG. 4A and FIG. 4B depict an example vehicle identification card and an example document that may be transmitted to the insured via the internet or mail. FIG. 3, FIG. 4A, and FIG. 4B are described in more detail below within the context of the operations described in FIGS. 5-14. Additionally, those skilled in the art will note that some elements depicted in the block diagram are indicated in dashed lines, which in general, and throughout the disclosure, is indicative of the fact that they are considered optional.

At a high level of abstraction, FIG. 3 depicts one or more users 101-2 through 101-N where N is an integer greater than 1 associated with their personal computers. FIG. 3 shows an user 101 who may have a personal computer 102 connected to a network such as the internet. The user 101 may own a vehicle 120 that is insured by a provider 150.

The provider may include a web server 156 connected to the internet via a network connection. The web server may have access to a database 155 of user accounts via a database management module 151. The provider 150 may optionally include a credit processing module 130 that is configured to handle credit card transactions, or the provider 150 may optionally be connected to a credit card company 160 or other entity that includes a credit card processing module 130.

The user 101 may make purchases with their vehicle identification card 100 at one or more companies 140-1 through 104-N where N is an integer greater than 1. Each company 140-1 . . . 140-N may include a credit processing module 142 that allows each company to authorize credit transactions. The provider 150 may also employ agents 101-A and provide the agents with terminals 102. The agents may submit requests to the database 155 via the network for information such as the user's account. The agents may then provide services for the user 101.

FIG. 4A illustrates an embodiment of a vehicle identification card 200 of the present disclosure. The embodiment of vehicle identification card 200 illustrates a first and a second side 200A and 200B respectively. In various embodiments, the vehicle identification card 200 may be issued by the provider 150. The example vehicle identification card 200 includes a proof of insurance statement 202 that allows the card to be presented as proof of insurance, the VIN number 205 of the vehicle in which the card is associated, the expiration date of the card 206, account information 201 and a magnetic strip 203 that is encoded with account information.

FIG. 4B depicts an example document that may be embedded in a web page 210 generated by the system or printed and sent to the user 101 of the vehicle identification card 100. The web page 210 may include information about credit transactions 207, vehicle service reminders 206, and vehicle related notifications such as a recall notice 208.

One skilled in the art will recognize that the operations illustrated in FIGS. 5-14 are examples and other embodiments exist. Those skilled in the art will note that some operations in FIGS. 5-14 are indicated by dashed lines, which, in general, indicates that they are to be considered optional. More specifically, different implementations will typically employ one of more herein-described operations dependent upon context, and the selection of the appropriate operations(s) appropriate to the various context(s) is within the skill of one in the art in light of the teachings herein.

Figure 5:
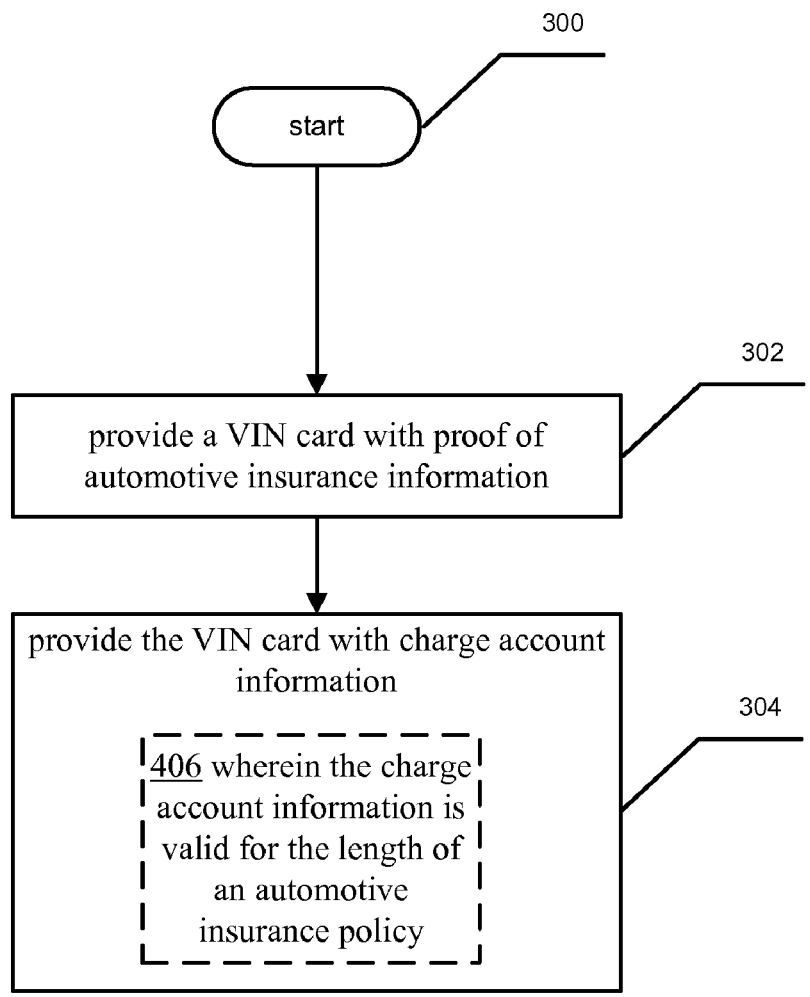
FIG. 5 illustrates an operational flow representing example operations related to generating vehicle identification card including an additional optional operation.

FIG. 5 depicts the example operational flow 300 including an additional operation 406. Operation 300 begins the operational process, typically at a provider 150 pursuant to enrolling user 101 into an insurance policy. Operation 302 illustrates providing a vehicle identification card with proof of automotive insurance information. For example, as depicted in FIG. 3, provider 150 issues a vehicle identification card 100 that includes proof of automotive insurance information 102. The example card 100 of FIG. 3 may have the look and feel of a banking card such as an ATM card, credit card, debit card or any other type of card. The card 100 of FIG. 3 may include proof of automotive insurance information 102. The information may contain a POI (proof of insurance) notification including, for example, a proof of liability disclaimer that establishes the card as a valid proof of liability insurance for a vehicle. While a notification including a disclaimer is disclosed, one skilled in the art will appreciate that a POI notification may include any type of identifying information that an insured person can present to a third party to prove they have valid insurance issued by an insurance company. A more specific example vehicle identification card that includes proof of automotive insurance information is depicted by the card 200 of FIG. 4A.

Operation 304 illustrates providing the vehicle identification card with charge account information. For example, provider 150 can issue a vehicle identification card 100 that may include charge account information 104. The charge account information 104 can be encoded within the vehicle identification card so that the user 101 can use the vehicle identification card like a credit card. The vehicle identification card in some embodiments can be similar to the card 200 of FIG. 4A. The card 200 may include, for example, a number located on the card 201, data stored in a computer chip (not shown) or a magnetic strip on the card 203.

Additionally or alternately, the operational flow 300 may include example operation 406 that illustrates charge account information that is valid for the length of an automotive insurance policy. For example, provider 150 may issue a vehicle identification card 100 that can be utilized as a credit card. The credit card portion of the card may only be valid for the length of an insurance contract associated with a vehicle 120. As depicted more explicitly by the example card in FIG. 4A, the expiration date 206 of the card 200 is desirably the same as the length of an insurance policy covering a vehicle 120, but in other example embodiments, the expiration date can be set to expire at a date prior to the term of the insurance policy or after the term of the insurance policy.

Figure 6:
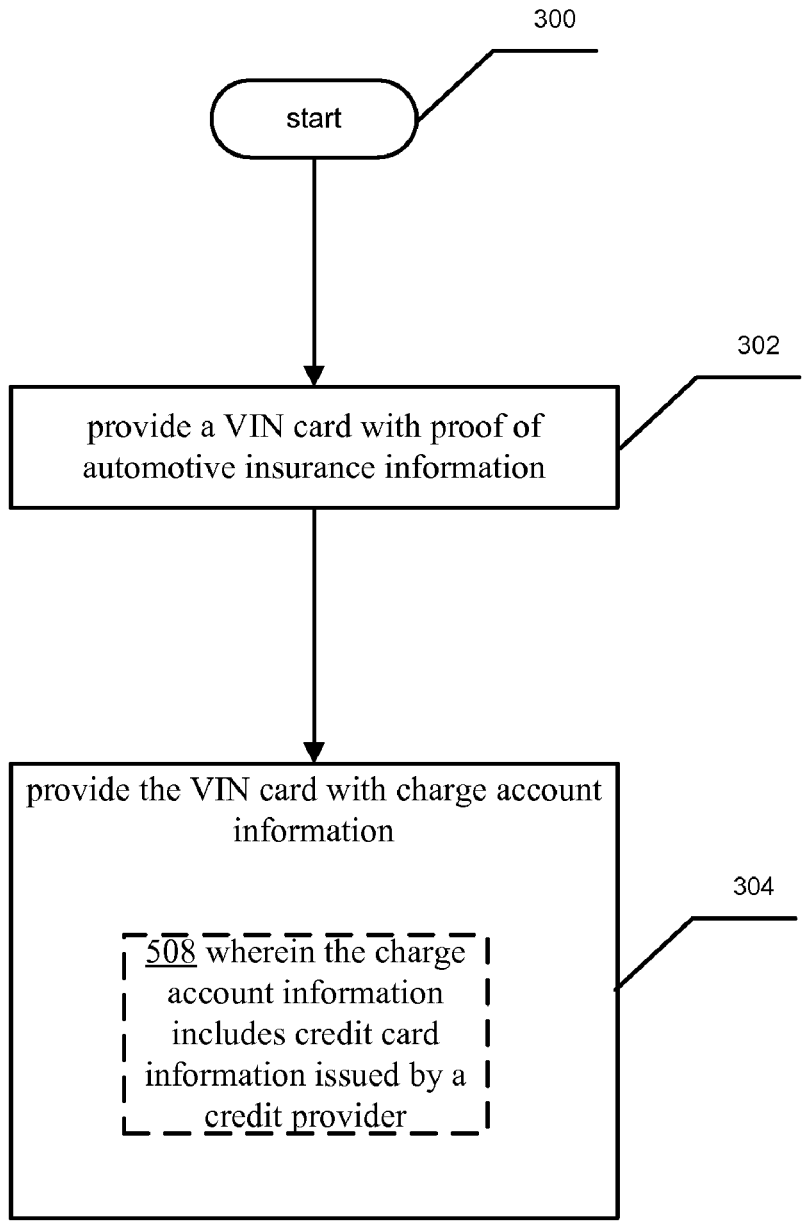
FIG. 6 illustrates an alternative embodiment of the operational flow of FIG. 5.

FIG. 6 depicts the example operational flow 300 including an additional operation 508. Operation 508 depicts providing charge account information that includes credit card information issued by a credit provider as another additional example embodiment of the operational flow 300 of FIG. 5. For example, a provider 150 may generate a vehicle identification card 100 that includes account information 104 that is associated with a credit processing company 160 such as VISA® or American Express®. The account information 104 allows the vehicle identification card 100 to be used as a credit card in a credit based transaction.

Figure 7:
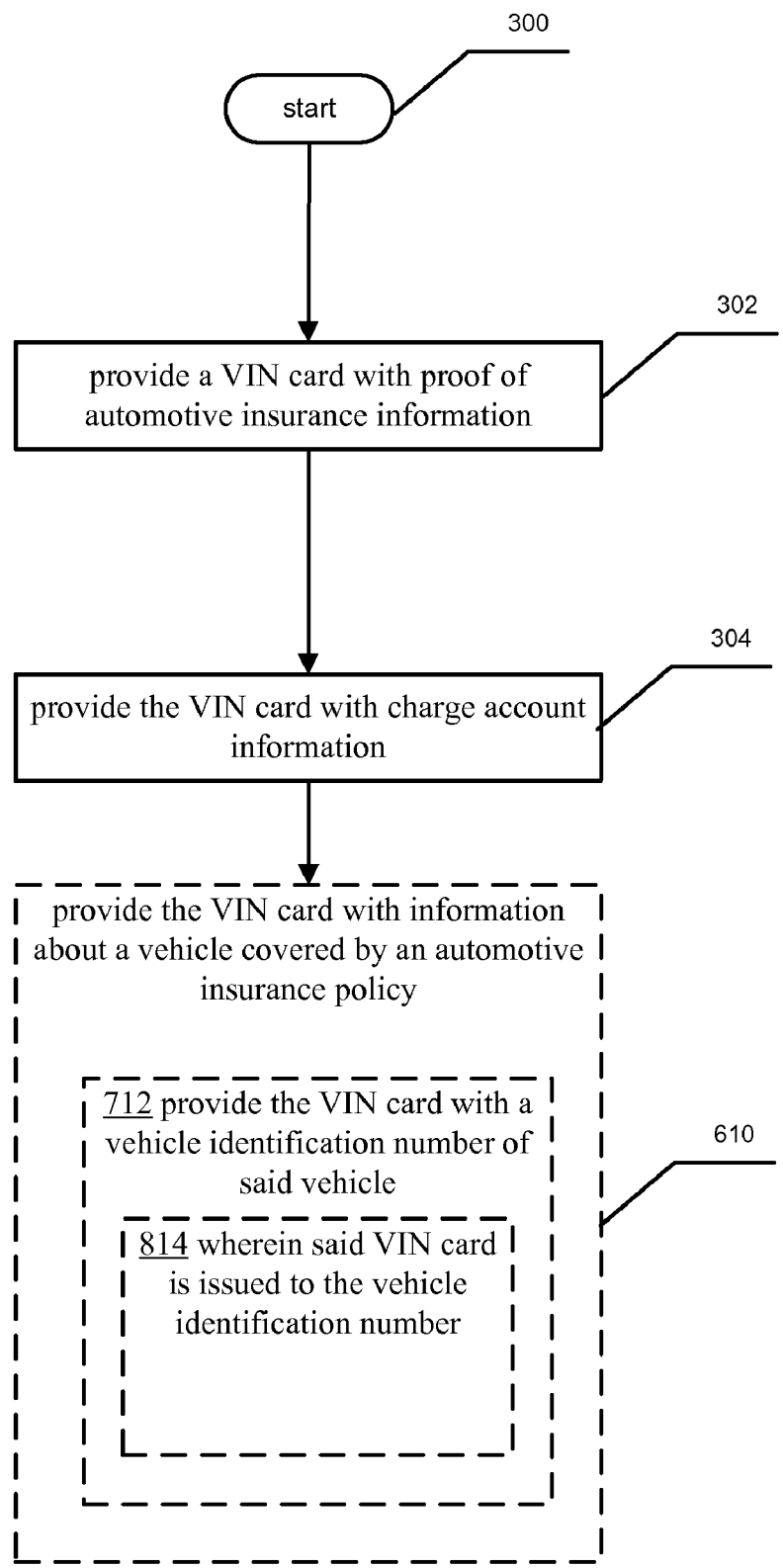
FIG. 7 illustrates additional alternative embodiments of the operational flow of FIG. 5.

FIG. 7 depicts the example operational flow 300 including multiple additional operations. In some embodiments, the operational flow 300 may include operations 610, 712, and 814. In operations that include operation 610, a provider 150 may create a vehicle identification card 100 that includes information about a specific vehicle 120 covered by the proof of insurance such as the make and model of the vehicle, or any other type of information related to the vehicle.

In embodiments of the operational flow 300 that include operation 712 the information integrated with the vehicle identification card 100 may include information about the specific vehicle 120 such as the vehicle identification number, or VIN number 103 of the vehicle 120 covered by an insurance contract. A more detailed example of the information that may be integrated into a vehicle identification card is depicted by the example card of FIG. 4A.

Furthermore, in embodiments of the operational flow 300 that include operation 814 the vehicle identification card 100 of FIG. 3 may be issued to the vehicle 120. For security purposes, having the vehicle identification card 100 issued to the VIN number 103 of the vehicle 120 assures a company 140-1 working on the vehicle 120 that the vehicle identification card 100 is not stolen because the fact that the VIN number of the card 103 is same as the VIN number of the vehicle 120. For example, an automotive repair shop may perform work on a vehicle 120. When a user 101 presents the vehicle identification card 100 as payment for any services performed the repair shop may compare the VIN number 103 of the vehicle identification card 100 to the VIN number of the vehicle 120 in order to determine whether to accept the card as payment. A specific example of issuing a vehicle identification card to the VIN number of a vehicle is depicted in FIG. 2A. For example, the card 200 may not include the name of the user 101, but only the VIN number 205 of the vehicle that it is associated with.

Figure 8:
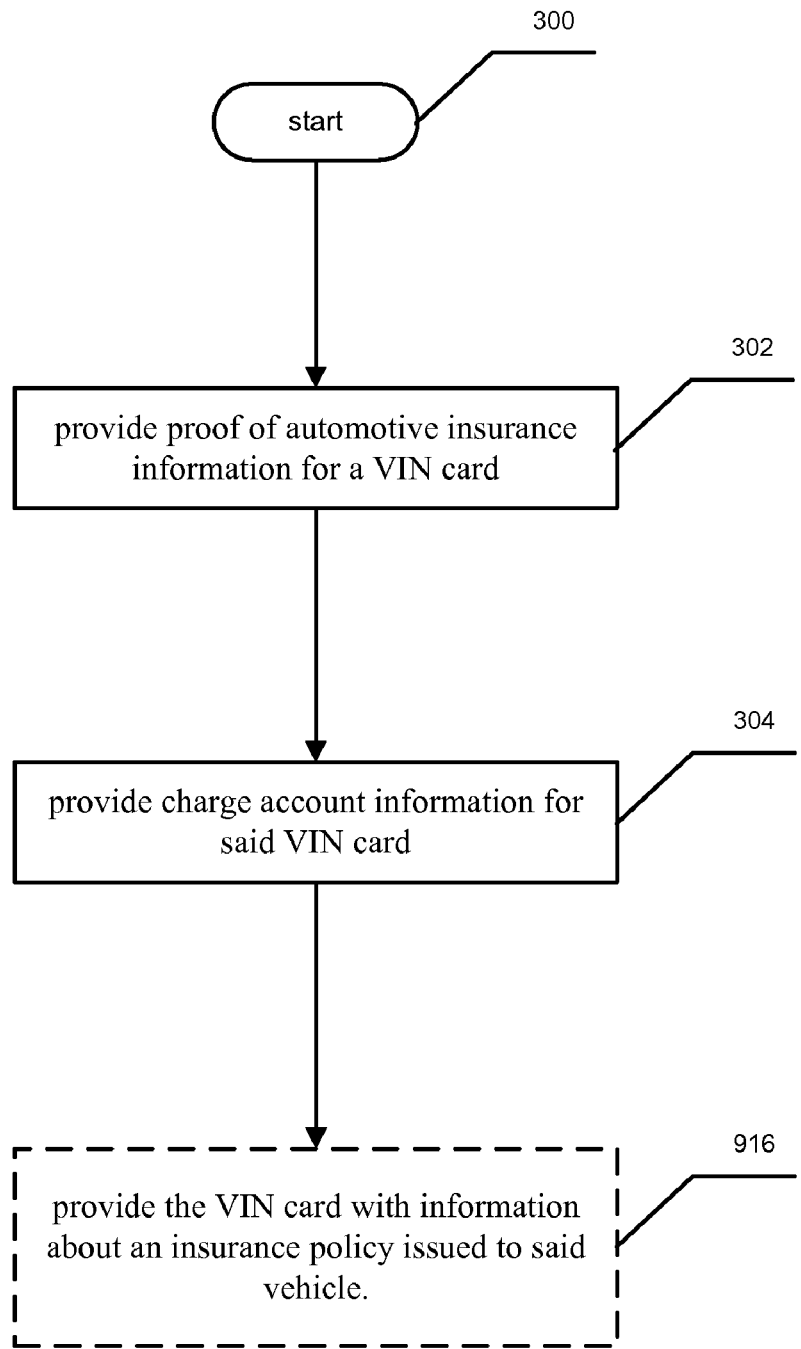
FIG. 8 illustrates an alternative embodiment of the operational flow of FIG. 5.

FIG. 8 depicts another embodiment of the example operational flow 300 including another optional operation 916. Operation 916 of FIG. 8 illustrates providing the vehicle identification card with information about an insurance policy issued to said vehicle. For example, insurance provider 150 of FIG. 3 provides a vehicle identification card 100 including an insurance policy covering the vehicle 120.

Figure 9:
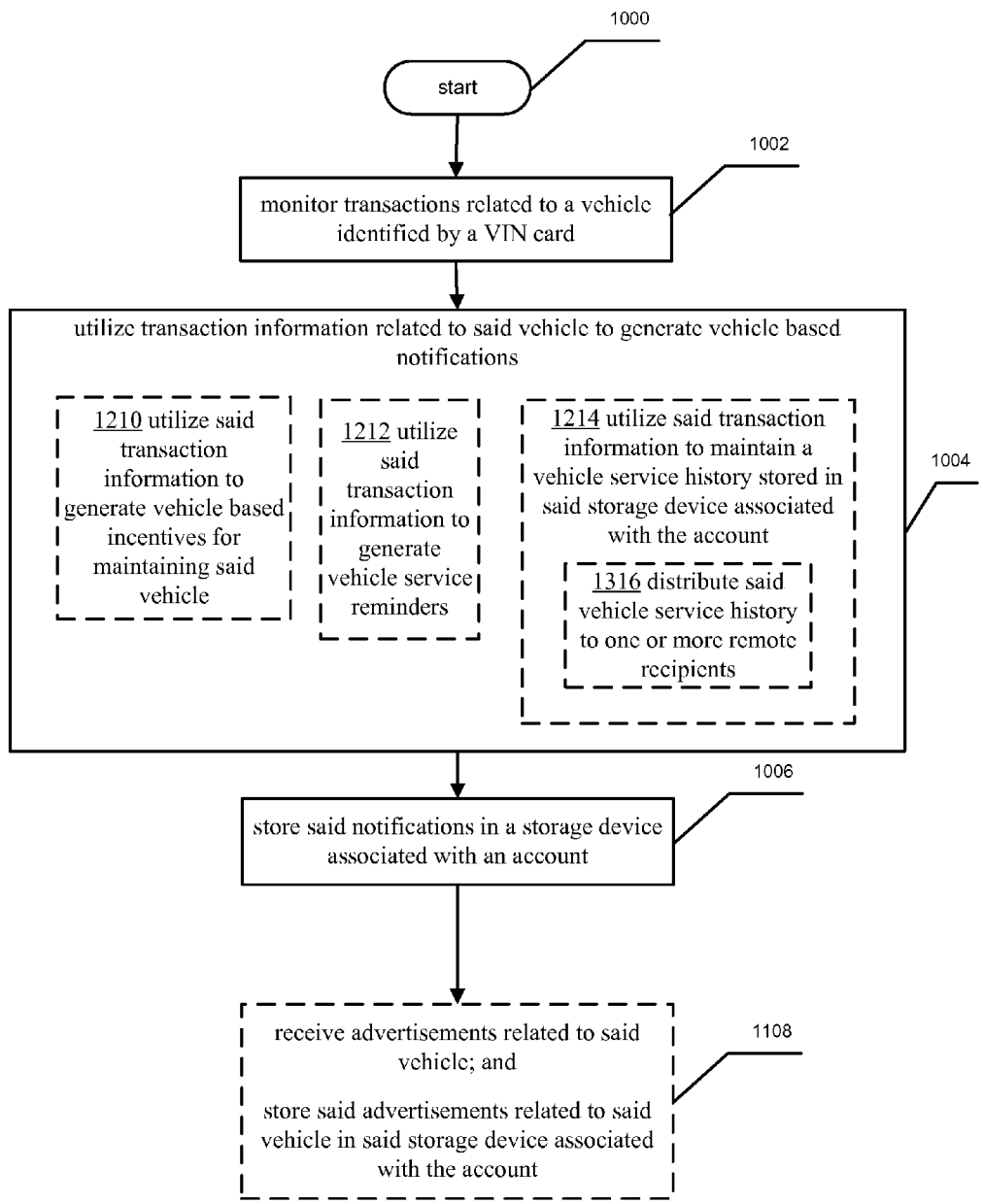
FIG. 9 illustrates an operational flow representing example operations related to monitoring vehicle related transactions including additional optional operations.

FIG. 9 illustrates example operations related to monitoring vehicle related transactions including operations 1000-1006 and additional optional operations.

Operation 1000 begins the operational process, typically such a process begins after a user 101 is issued a vehicle identification card 100 and begins to purchase services and items with the vehicle identification card 100. Operation 1002 illustrates monitoring transactions related to a vehicle identified by a vehicle identification card. For example, credit processing module 130 that may be either maintained by an insurance provider 150, or a credit card company 160 may monitor, e.g., receive one or more packets of information over a network connection 152 from one or more companies 140-1 through 140-N, that indicate that a credit transaction was performed. The database management module 151 may then determine whether the transaction was for a vehicle 120 (or related expense) identified by the vehicle identification card 100, e.g., the software may check each transaction by a user 101 to see if it was at a gas station, or at a oil changing shop.

Operation 1004 illustrates utilizing transaction information related to said vehicle to generate vehicle based notifications. For example, database management module 151 may determine that at least one credit transaction was related to the vehicle 120 by comparing the VIN number 103 of the vehicle identification card stored in a user account maintained by a database to the VIN number 103 of the car 120 identified by the vehicle identification card 100 and the module 151 may generate one or more packets of information including a notification for the user 101. The notification may be to notify the user 101 that they received rewards for making the purchase, or any type of notification.

Operation 1006 illustrates storing said notifications in a storage device associated with an account. For example, database management module 151 may store the notification generated by operation 1004 in a database 155 managed by the provider 150. The database 155 may be accessed by a web server 156 in order to generate, in response to a http request from personal computer 102, a web page 210 such as the web page shown by FIG. 4B that includes a list of prior credit card transactions 207 and a list of vehicle related notifications such as the example vehicle related notifications displayed in the service reminder section 206 of webpage 210.

As depicted by FIG. 9, in various embodiments of the operational procedure 1000 the procedure may include operation 1108. In embodiments that include the optional operation 1210, the database management module 151 may receive one or more packets of information indicative of an electronic advertisement from one or more companies 140-1 through 140-N. The companies 140-1 through 140-N may have performed a service for the vehicle 120, or may be soliciting vehicle related work from the user 101. A web server 156 may process such requests and store such advertisements in a database 155 so that if the user 101 requests access to their account the web server 156 may generate code operable to render a webpage that includes a list of credit card transactions and targeted advertisements.

As depicted by FIG. 9, in various embodiments of the operational procedure 1000 the procedure may include operation 1210. In embodiments that include operation 1210, the database management module 151 may determine that at least one credit transaction was for, or related to, the vehicle 120 and generate an incentive for the user 101. The incentive may be a reward, e.g., a coupon, a rebate, a discount, or any other type of incentive to give the user 101 an additional reason to take care of their vehicle.

As depicted by FIG. 9 the operational procedure 1000 may include operation 1212. In embodiments that include such an operation, the database management module 151 in one embodiment may generate one or more reminders for the user 101 to perform a vehicle related act in the future such as a reminder to change their vehicle's oil in 3 months.

As depicted by FIG. 9 the operational procedure 1000 may include operation 1214. In embodiments that include such an operation, the database management module 151 may identify vehicle related transactions for the vehicle 120 and generate a vehicle history report for the vehicle 120.

As further depicted by the operational operation 1316, once the database management module 151 has generated a vehicle history report, in some embodiments, the web server 156 may distribute the report in response to a request via a network connection 152 from a user 101 that indicates that the user 101 wants to allow other users 101-2 through 101-N to access the vehicle history report. The web server 156 may, for example, transmit the vehicle history report to a recipient via an email, or the web server may transmit html code operable to generate a vehicle history on the user's personal computer 102.

Figure 10:
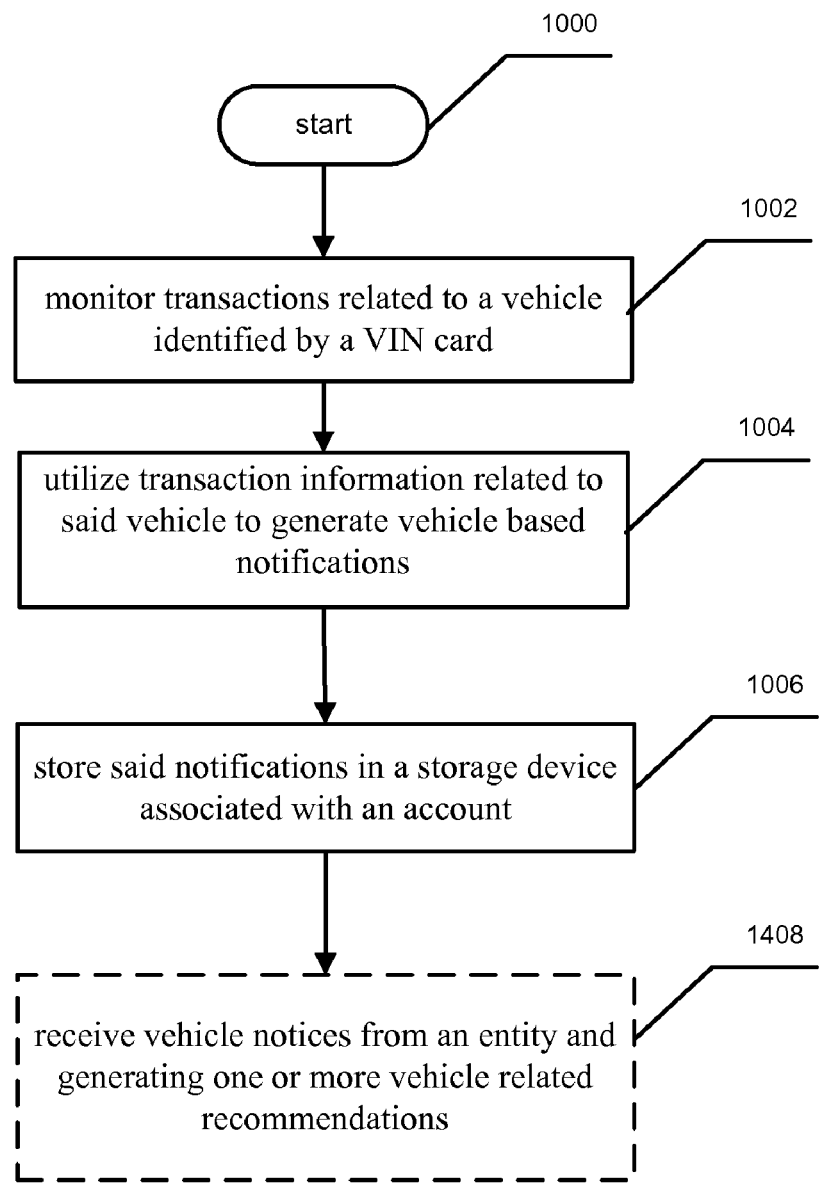
FIG. 10 illustrates an additional alternative embodiment of the example operational flow of FIG. 7.

FIG. 10 depicts the example operational flow 100 including an additional operation 1408. Operation 1408 illustrates receiving vehicle notices from an entity and generating one or more vehicle related recommendations. For example, database management module 151 may receive one or more packets of information indicative of a notification from an entity such as a company 140-1 through 140-N that performed a service on or for the vehicle 120, or manufactured parts that are in the vehicle 120. The database management module 151 may then generate vehicle related recommendations such as a recommendation to replace a part due to a factory recall of the part. An example of such a notification is depicted by the recall notice area 208 of the example document 210 of FIG. 4B.

Figure 11:
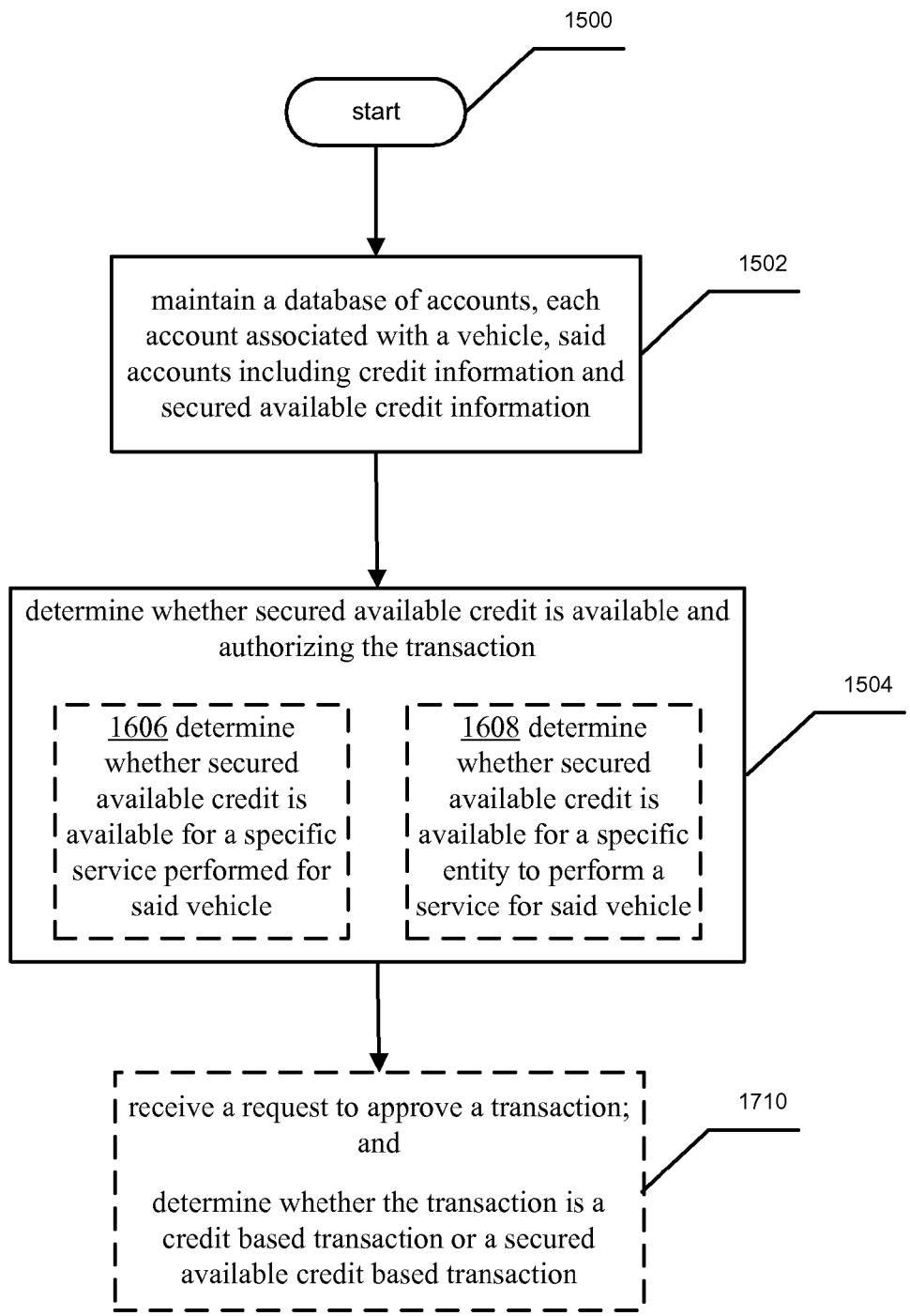
FIG. 11 illustrates an operational flow representing example operations related to authorizing vehicle based transactions including additional optional operations.

FIG. 11 illustrates example operations related to authorizing vehicle based transactions including operations 1500-1504 and additional alternative operations.

Operation 1500 begins the operational procedure, typically after the provider 150 has issued a vehicle identification card 100 to a user 101 and the user 101 utilizes the vehicle identification card to purchase items or services. Operation 1502 illustrates maintaining a database of accounts, each account associated with a vehicle, said accounts including credit information and secured available credit information. For example, database 155 of provider 150 may include multiple accounts, and each account may include information related to a vehicle 120 the provider insures, a credit limit of the user 101, and the secured available credit of the user 101. The secured available credit, or SAC, can be an amount of credit stored in the account of the user 101. The amount of credit may have previously been deposited into the account by an agent 101-A who works for the provider 150, or it may deposited by the user 101. In one example embodiment, the SAC may be used to increase the credit limit of the user 101 in order for credit transactions greater than the credit limit of the user 101 to be approved, e.g., the credit limit of the user 101 is temporarily increased from $500 to $2000 in order for a certain transaction to be approved.

In other embodiments the SAC may be a separate fund that can be utilized by the credit processing module 130 to approve transactions under certain circumstances. In this embodiment the user 101 may have two separate funds in their account, the funds may be thought of as separate pools of credit in the same account or separate credit sub-accounts in an account. One skilled in the art will appreciate that there are multiple ways to separate pools of credit and that the disclosed embodiments are not limited to any specific way of distinguishing between two different funds.

Operation 1504 illustrates determining whether secured available credit is available and authorizing the transaction. For example, credit processing module 130 of provider 150 may receive a request to approve a vehicle related transaction. In one example situation, the amount of the vehicle related transaction may be more than the approved credit limit of a user 101. In one embodiment the user 101, or agent 101-A may have previously released SAC to increase the credit limit of the user 101. Thus, when the credit processing module 130 checks the credit limit of the user 101 it will determine that the user's limit is adequate for the transaction and approve the transaction.

In another example embodiment, the SAC may be a separate fund. In response to receiving a request to approve the transaction, the credit processing module 130 may invoke the database management module 151 to determine whether there is any SAC available that can be to approve the transaction. In this example, the credit processing terminal 142 located at a business 140-1 may receive the card, e.g., the card is swiped and the information is read out from the card and a prompt is provided (e.g., displayed) asking which fund should be used to process the transaction. The prompt may be, for example, a screen rendered on the credit processing terminal 142 requesting that a user 101 press 1 for a credit transaction, or 2 for a secured SAC transaction. The prompt may request that a user 101 input a SAC pin, such as a 4 digit number that the user 101 knows, or the prompt may request that a user 101 input a one-time-usable pin for the specific transaction that was given to the user 101 from an insurance agent 101-A. The agent 101-A may have given the pin to the user 101 via a phone conversation, an email, a text message, etc.

As depicted by FIG. 11, the example operational flow 1500 may include the additional operation 1606 that illustrates determining whether secured available credit is available for a specific service performed for said vehicle. For example, credit processing module 130 of provider 150 may receive a request to approve a vehicle related transaction over a network connection 152. The credit processing module 130 may invoke a database management module 151 that may check the account of the user 101 associated with the vehicle identification card 100 to determine whether funds have been approved for the specific service performed and, if the funds were approved the credit processing module 130 may approve the transaction. The credit transaction may indicate, for example, that the transaction was an SAC transaction and that the transaction is for a specific service performed for or on the vehicle 120, e.g., the windshield wipers were changed, the rear bumper was fixed, or any other type of service that could be performed on or for a vehicle 120.

FIG. 11 depicts additional embodiments of the operational procedure 1500 that include operations 1606 and 1608. In operational flows that include one or both of theses example operations, the credit processing module 130 of the provider 150 may receive a request to approve a vehicle related transaction over a network connection 152. In one embodiment, the database management software 151 may check to see if SAC has been earmarked for a specific company 140-1 to perform work on the vehicle. If SAC has been earmarked for a particular company 140-1 to perform the work and the request is from the company 140-1 the credit limit of the user 101 may be increased for the transaction in order for the transaction to be approved.

FIG. 11 additionally depicts the example operational flow 1500 including the example operation 1710 that illustrates receiving a request to approve a transaction, and determining whether the transaction is a credit based transaction or a secured available credit based transaction. For example, credit processing module 130 of provider 150 may receive a request to approve a transaction via a network connection 152 and the credit processing module 130 may determine whether the transaction is a typical credit card type of transaction, or if the transaction is a secured available credit type of transaction.

Figure 12:
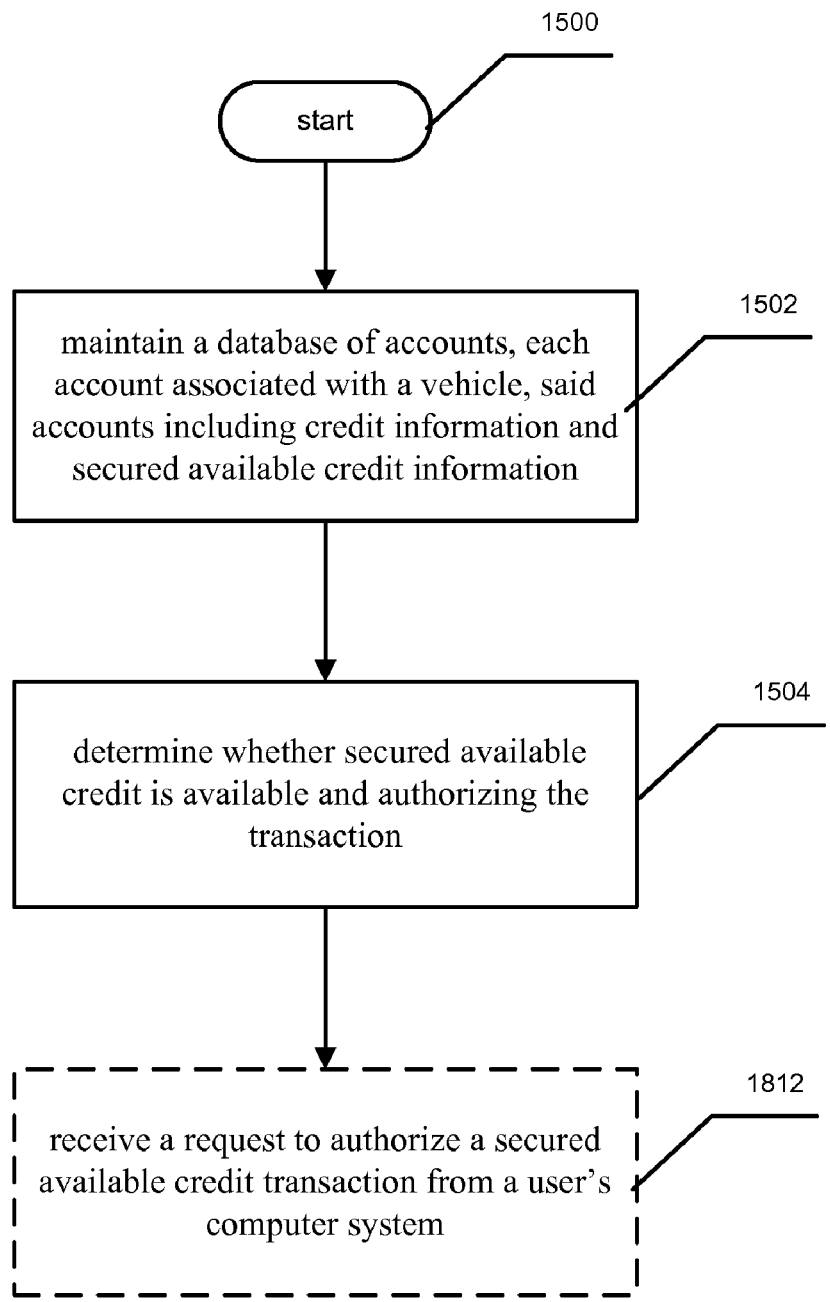
FIG. 12 illustrates an additional alternative embodiment of the example operational flow of FIG. 11.
Figure 13:
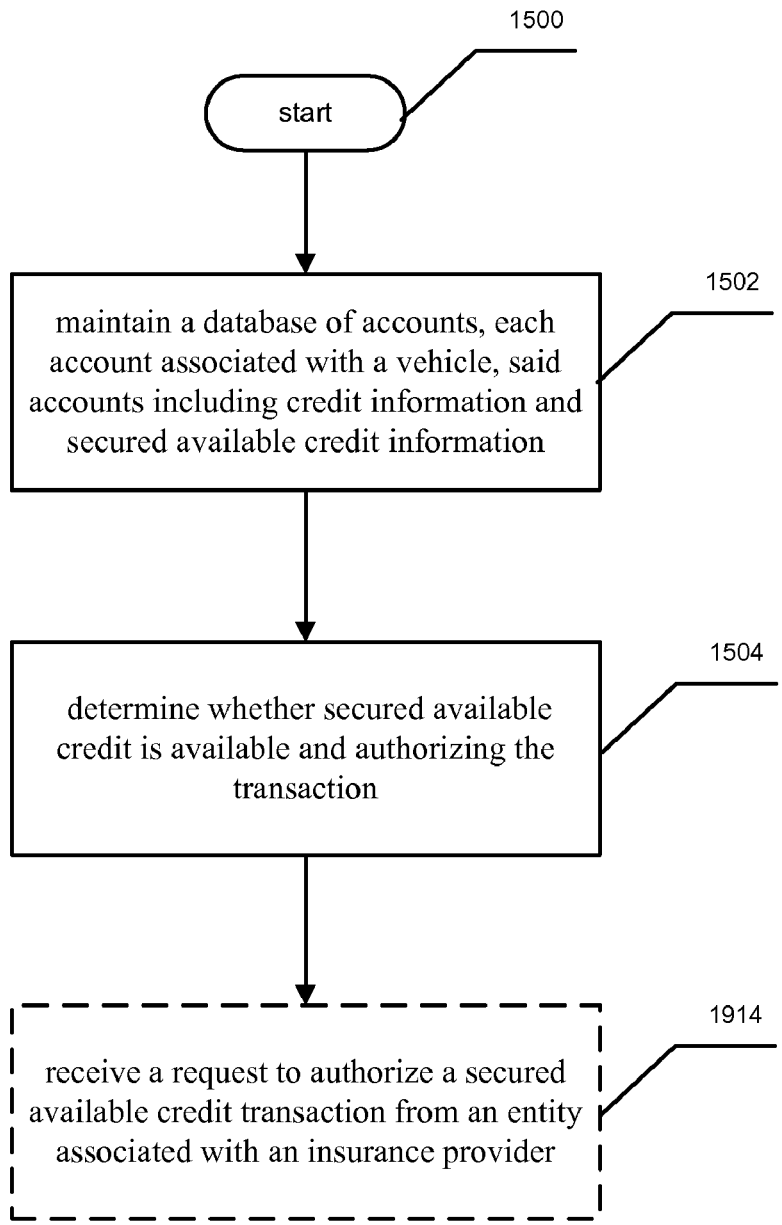
FIG. 13 illustrates an additional alternative embodiment of the example operational flow of FIG. 11.

FIG. 12 and FIG. 13 depict the example operational flow 1500 including operation 1812 (FIG. 12) and operation 1914 (FIG. 13). In example operational flows that include one or both of the example operations 1812 and 1914, a network connection 152 of web server 156 may receive one or more packets of information indicative of a request to authorize a transaction utilizing SAC from a user's computer system 102 and in response the web server may generate html operable to render a web page on the user's client 102. The webpage may include one or more fields of information similar to that of FIG. 4B and at least one dialog box that is configured to receive requests from a user 101 to authorize a SAC based transaction. The transaction may have been temporarily approved at the point of sale. The user 101 may then drive the vehicle 120 (testing to see if the repairs truly were performed correctly) and the user 101 may later access their account via the internet and approve the transaction. Once the transaction has been approved by the user 101, the repair shop may receive an approval code for the transaction, or a transfer of funds from the user's account to the company's account may occur. Alternatively or additionally, the request to authorize a transaction may originate from an insurance adjuster's terminal 102-A. The insurance adjustor may have previously released SAC.

Figure 14:
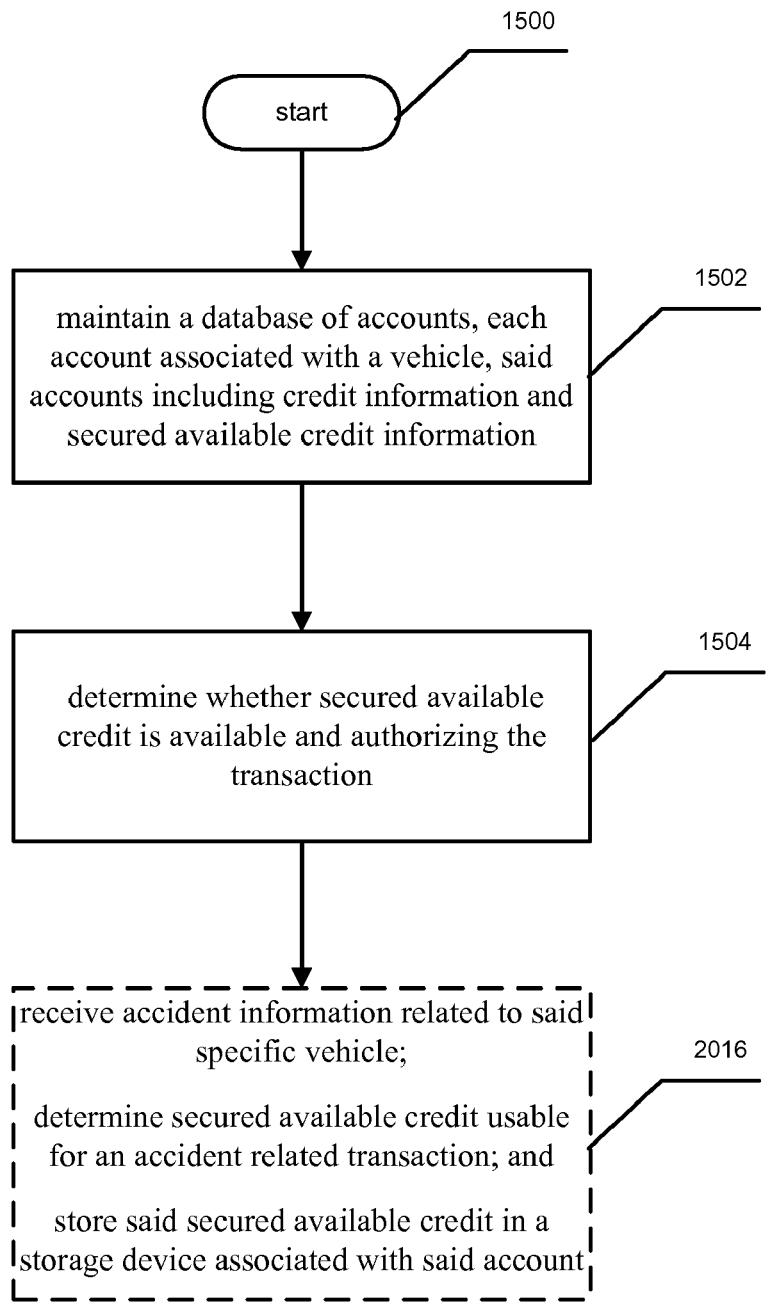
FIG. 14 illustrates an additional alternative embodiment of the example operational flow of FIG. 11.

FIG. 14 depicts the example operational flow 1500 including additional operation 2016. Operation 2016 illustrates receiving accident information related to said specific vehicle; determining secured available credit usable for an accident related transaction; and storing said secured available credit in a storage device associated with said account. For example, insurance adjuster terminal 102-A may receive information related to an accident involving a specific vehicle 120 owned by a user 101. The information may be processed by the terminal 102-A and an amount of SAC may be determined based on the make and model of the vehicle 120, the type and amount of damage to the vehicle 120, and how much the vehicle 120 was worth before the accident. The SAC may then be stored in a database 155 associated with the account of the user 101. The SAC may then be utilized to pay for repairs to the vehicle 120.

The foregoing detailed description has set forth various embodiments of the systems and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof.

Wirelessly Updated VIN Card with Display

Figure 15:
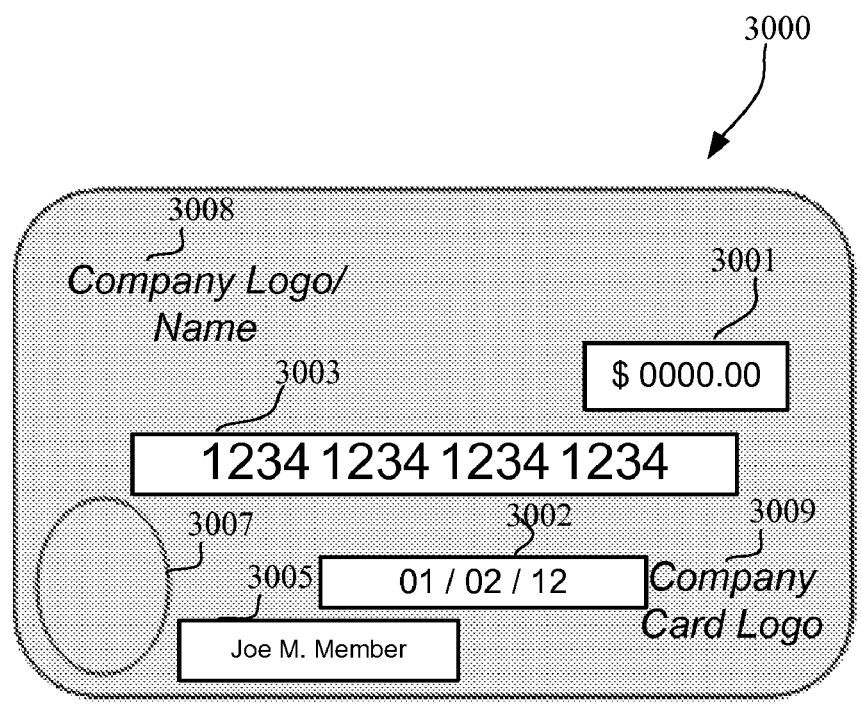
FIG. 15 is a front exterior view of an example wirelessly updated vehicle identification card with a dynamic display.

In one embodiment of the present disclosure, a wirelessly updated VIN card incorporating one or more of the characteristics described above is disclosed. FIG. 15 illustrates a front exterior view of an example wirelessly updated VIN card 1500 with one or more displays. In this example embodiment, the card 1500 may include one or more displays 3001, 3002, 3003, and or 3005 that can be activated and display the available balance of the card 3001, a card account number 3003, the card holder's name 3005, and/or card's expiration date 3002. Additionally, one skilled in the art will appreciate that the entire front panel of the card may be a display, and the example card disclosed is not a limiting example. In addition to the one or more displays, the card 3000 may include a biometric input area (e.g., thumbprint reader) 3007, an area for the bank or financial institution's name and/or logo 3008, and an area for the credit card network name and/or logo 3009 (which is often a holographic image). The card 3000 may be approximately the size of a standard sized credit card. For example, the ID-1 format of the International Organization for Standardization (ISO) 7810 specifies a size of 85.60× 53.98 mm (3.370×2.125 in) with a thickness of 0.76 mm and corners rounded with a radius of 3.18 mm. This size is commonly used for banking cards (ATM cards, credit cards, debit cards, etc.) and is suitable for the example wirelessly updated vehicle identification card with a dynamic display described herein. However, other sizes and standards for identification or banking cards may also be suitable.

As illustrated in FIG. 15, the one or more displays, 3001, 3002, 3003, and/or 3005 may be any thin film display that is able to be integrated with a vehicle identification card 3000 of the approximate size described above. For example, aspects of the present disclosure may utilize displays that comprise a thin, flexible display, such as a light-emitting polymer (LEP) display for displaying information denoting account information, and/or other information. The LEP display may cover, for example, a portion of the surface of the card 3000, i.e., section 3001, section 3003, etc., or one display may cover the whole surface of at least one side of the card 3000 (not shown). Also, the display may be touch-sensitive, e.g., it may provide the user with a number of graphical images which enable the user to selectively chose a card feature by touching selected parts of the touch-sensitive display.

The card can include a microprocessing unit (MPU) for executing instructions stored in a memory, a liquid crystal display (LCD), coupled to the MPU for displaying information, a keypad coupled to the MPU and to the display for entering data by the user, an interface for transferring signals between the card and an external system such as a card reader, a point of sale terminal (POS) terminal, or an automated teller machine when the smart card is in short range of the external system. The card can include photovoltaic cells for providing power to the card when the card is exposed to light.

Figure 16:
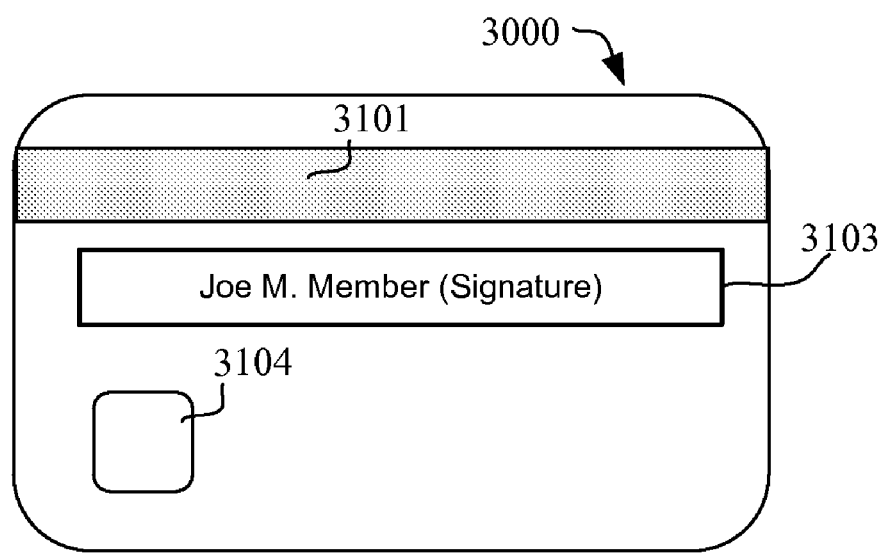
FIG. 16 is a back exterior view of the example wirelessly updated vehicle identification card with a dynamic display of FIG. 15.

FIG. 16 depicts a back exterior view of the example wirelessly updated vehicle identification card with a dynamic display of FIG. 15. Shown is a credit card magnetic strip area 3101, a card holder signature area 3103 that may in some embodiments be contained within a display and include a digital image of the user's signature, and a card microprocessor processing device 3104.

Figure 17:
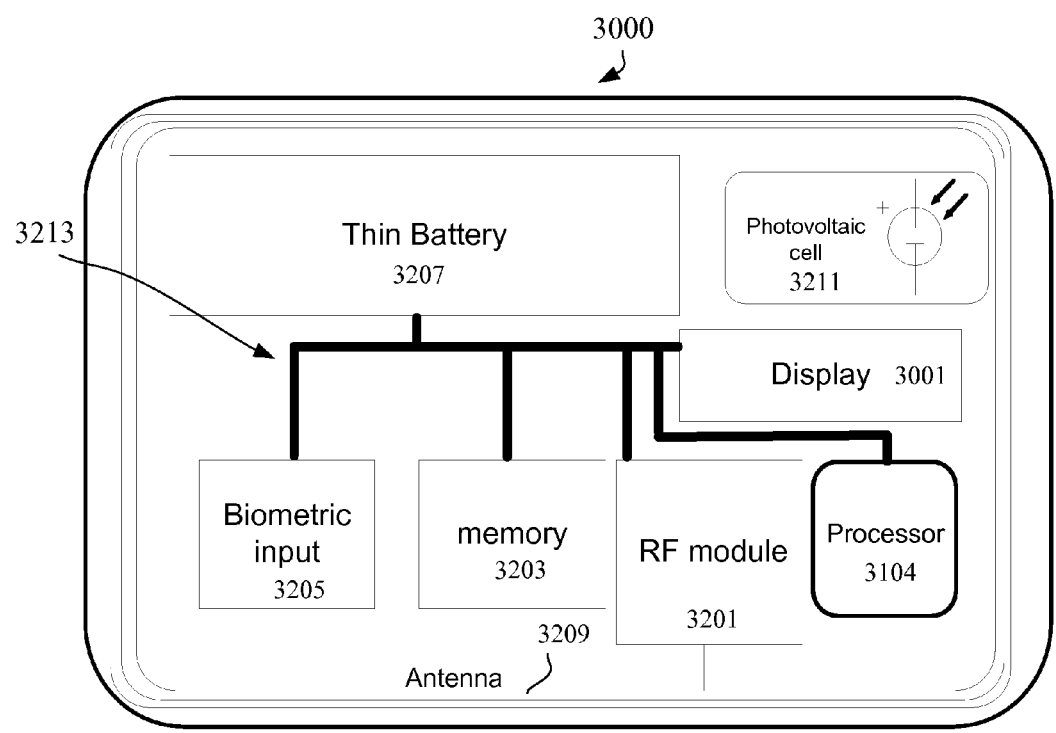
FIG. 17 is an interior view of the example wirelessly updated vehicle identification card of FIG. 15 showing an example configuration of various high level components within the card.

FIG. 17 depicts an interior view of the example wirelessly updated vehicle identification card of FIG. 15 showing an example configuration of various high level components within the card. Shown is a microprocessor 3104, a RF transceiver 3201, an integrated antenna 3209, a memory module 3203, a biometric input module 3205, a thin battery 3207 connected to an energy supply such as a photovoltaic cell 3211, an example display 3001, and a system bus 3213 communicatively connecting these major components.

The thin battery 3207 is that which provides enough power to operate the other individual components within the card, such as batteries available from Thin Battery Technologies, Inc. located in Parma, Ohio. Example battery specifications are as follows: Thickness <0.4 mm, Voltage >2 Volts, Size 2.2×2.9 $cm^2$, rechargeable <3 nm, energy: 20 mAh. However, variations from these specifications are also possible.

The biometric input area 3205 is an area that reads biometric identification data. This may be, for example, a thumb or fingerprint reader, voiceprint reader (using a built-in microphone), or facial feature data reader (using a built-in camera). The thumbprint reader may be, for example a silicon integrated sensor device such as those available from AuthenTec, Inc., located in Melbourne, Fla.

In some embodiments of the present disclosure, the RF transceiver 3201 can send and receive long range RF signals such as cellular telephone signals. A suitable transceiver may be included in a RF transceiver integrated circuit chip such as the BCM2085 65-nm CMOS DigRF EDGE Cellular Transceiver, available from Broadcom Corporation located in Irvine, Calif. This example transceiver chip is a 65-nm CMOS single chip quad-band GSM/GPRS/EDGE RF transceiver for GSM850/EGSM900/DCS1800/PCS1900 voice and data applications. In other embodiments, the RF transceiver may include a Bluetooth transceiver, a 802.XX transmitter such as a WiMAX transceiver or a WiFi transceiver, or an active or passive RFID tag. Other suitable transceivers may include, but are not limited to, any transceiver that has wireless capabilities and a small form factor.

The antenna 3209 is embedded within the card 3000 and is operatively connected to the RF transceiver 3201. The antenna 3209 may be looped around the perimeter of the card and/or across the card 3000 if the antenna 3209 is located on a different plane within the card 3000 than the other components for isolation purposes. In at least one embodiment, the antenna 3209 may be an Isolated Magnetic Dipole™ (IMD) internal cellular antenna.

Figure 18:
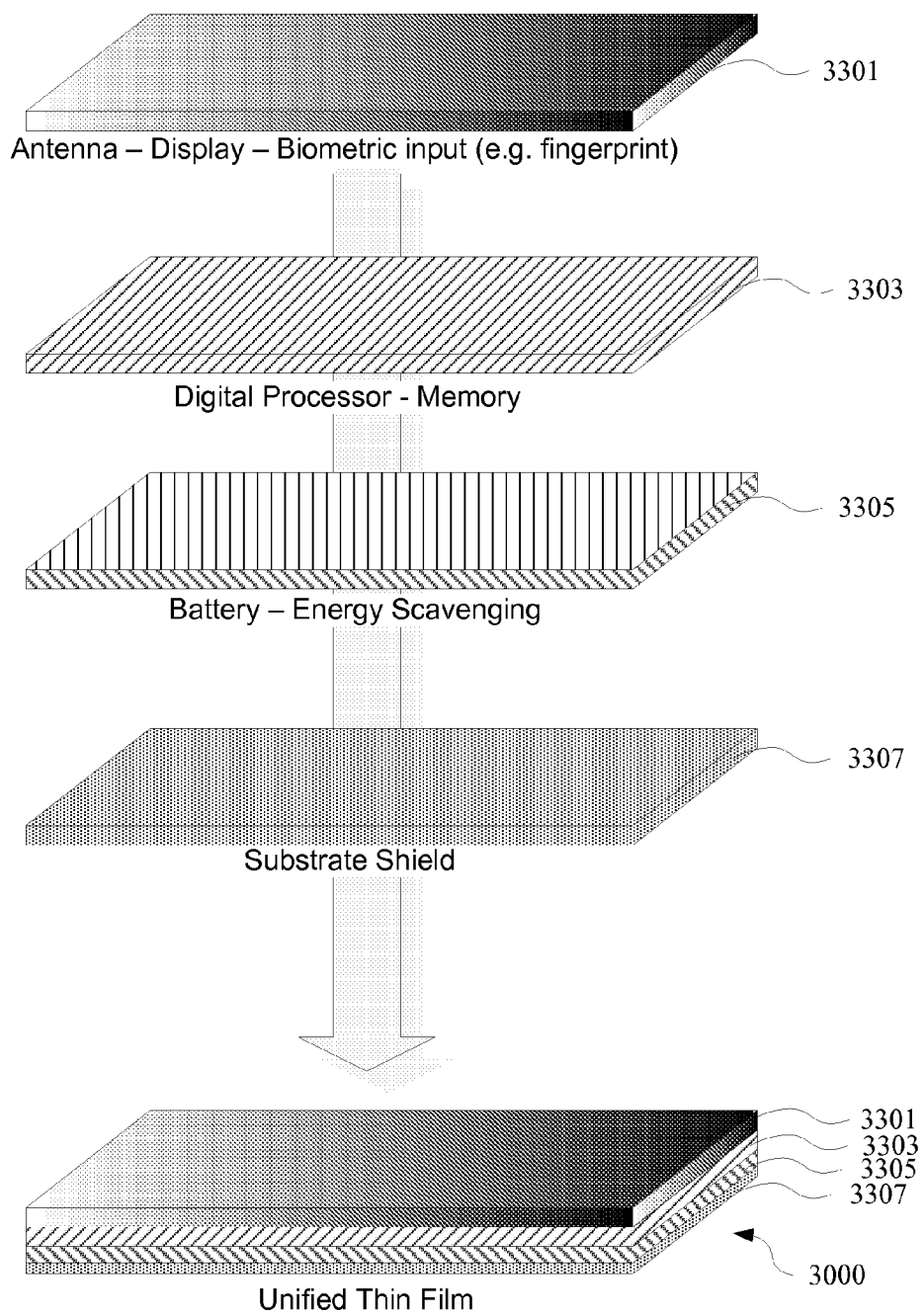
FIG. 18 is an exploded perspective side view of the wirelessly updated vehicle identification card of FIG. 15 along with a perspective side view of a completed assembly of the card.

FIG. 18 depicts an exploded perspective side view of the wirelessly updated vehicle identification card of FIG. 15, along with a perspective side view of a completed assembly of the card. Shown are four example layers. However, the number and type of layers may vary depending on the number and type of particular internal components included within the card 3000. The top layer is the Antenna—Display—Biometric input layer 3301. Next, coupled to the Antenna—Display—Biometric input (e.g. fingerprint) layer 3301 is the Digital Processor—Memory layer 3303. Coupled to the Digital Processor—Memory layer 3303 is the Battery—Energy Scavenging layer 3305. Finally, coupled to the Battery—Energy Scavenging layer 3305 is the Substrate Shield layer 3307. These layers all coupled together (with the substrate shield layer being an outside layer) form a unified thin film card assembly 3000.

Figure 19:
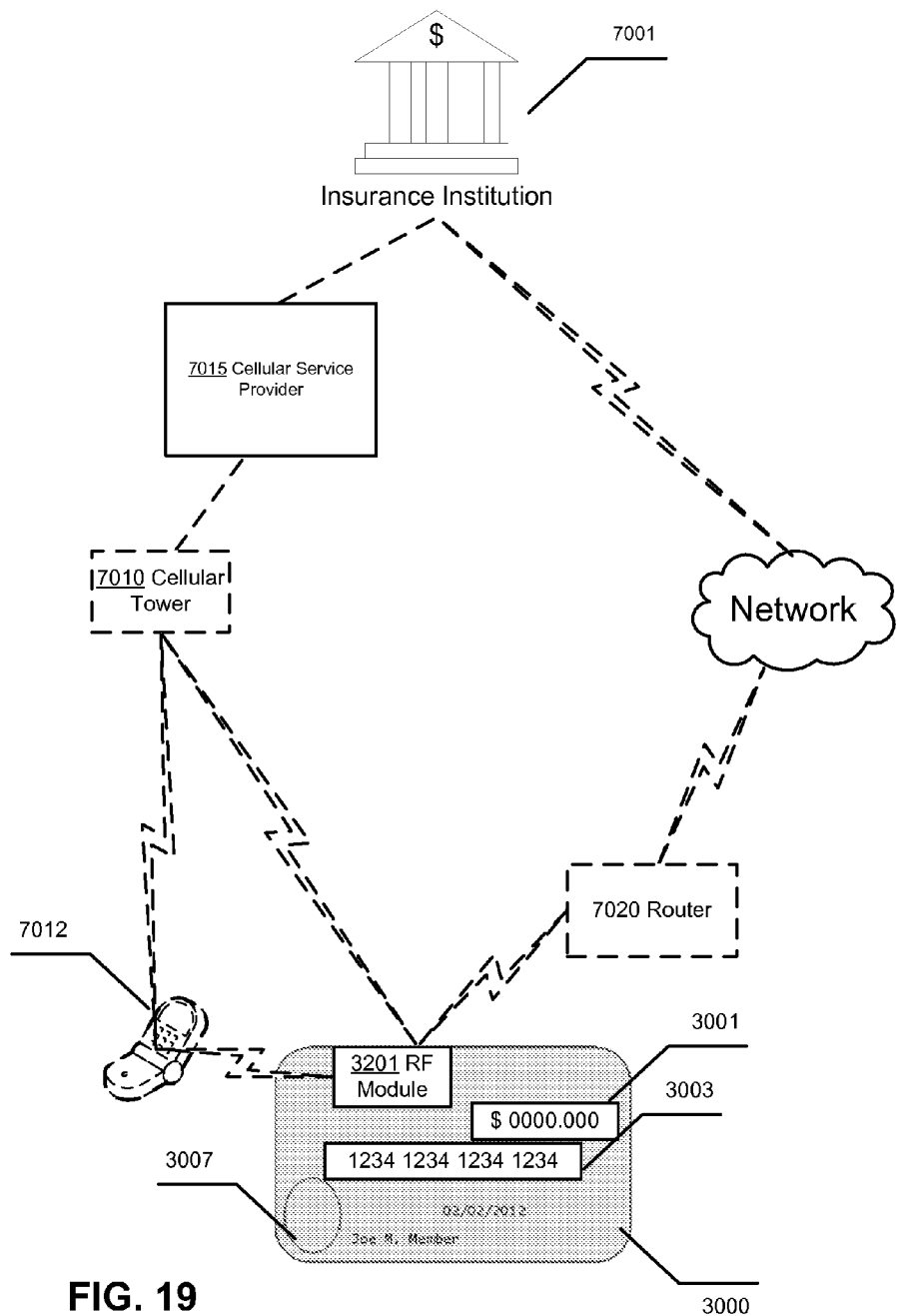
FIG. 19 is a diagram illustrating an example system in which the wirelessly updated vehicle identification card of FIG. 15 is updated directly via a long range wireless network.

FIG. 19 illustrates an example system wherein aspects of the present disclosure may be embodied. The example system of FIG. 19 is described in more detail below with respect to how the elements depicted interrelate with the operational procedures illustrated in the flow charts FIG. 20 through FIG. 24. One skilled in the art will note that the example elements depicted in FIG. 19 are provided to illustrate an operational context to practice aspects of the present disclosure. Thus, the example operational context is to be treated as illustrative only and in no way limits the scope of the claims. Furthermore, those skilled in the art will note that some elements depicted in FIG. 19 are indicated in dashed lines, which in general, and throughout the disclosure, is indicative of the fact that they are considered optional and/or they are considered to be optionally located at their position within their respective figure.

Generally speaking, the exemplary system includes an insurance institution 7001, that can include, or have access to, one or more databases of information that contain one or more customer accounts. The one or more databases of information can be coupled to a database management program that can perform complex operations to control the organization, storage, and retrieval of data in the databases. The system of FIG. 19 additionally includes a card 3000 similar to that described above that has an RF module 3201 and one or more displays 3001 and/or 3003, for example. Additionally, the card 3000 includes, in some embodiments, a biometric reader 3007. As shown in FIG. 19, the RF module 3201 of the card 3000 can, in some embodiments, be in wireless communication with a long range wireless tower 7010 that is electronically coupled to a long range wireless service provider 7015, i.e., a provider of long range wireless signals such as signals in the cellular frequency band. In additional, or alternative embodiments of the present disclosure, and described in more detail below, the long range signal tower 7010 may be in wireless communication with a user's cellular phone 7012. In these, and other embodiments, the cellular phone 7012 may be in wireless communication with the RF module 3201 of the card 3000. In this situation, the long range signal tower 7010 may transmit information to the cellular phone 7012, and the cellular phone may transmit the same, or additional information to the RF module 3201 using a cellular signal or a short range RF signal such as Bluetooth or RFID. FIG. 17 additionally depicts a close proximity RF system such as the router 7020 of FIG. 17. The router 7020 may include, but is not limited to, one or more hardware modules that include circuitry for enabling the router 7020 to communicate utilizing an 802 protocol such as 802.11 (WiFi) or 802.16 (WiMAX).

Figure 20:
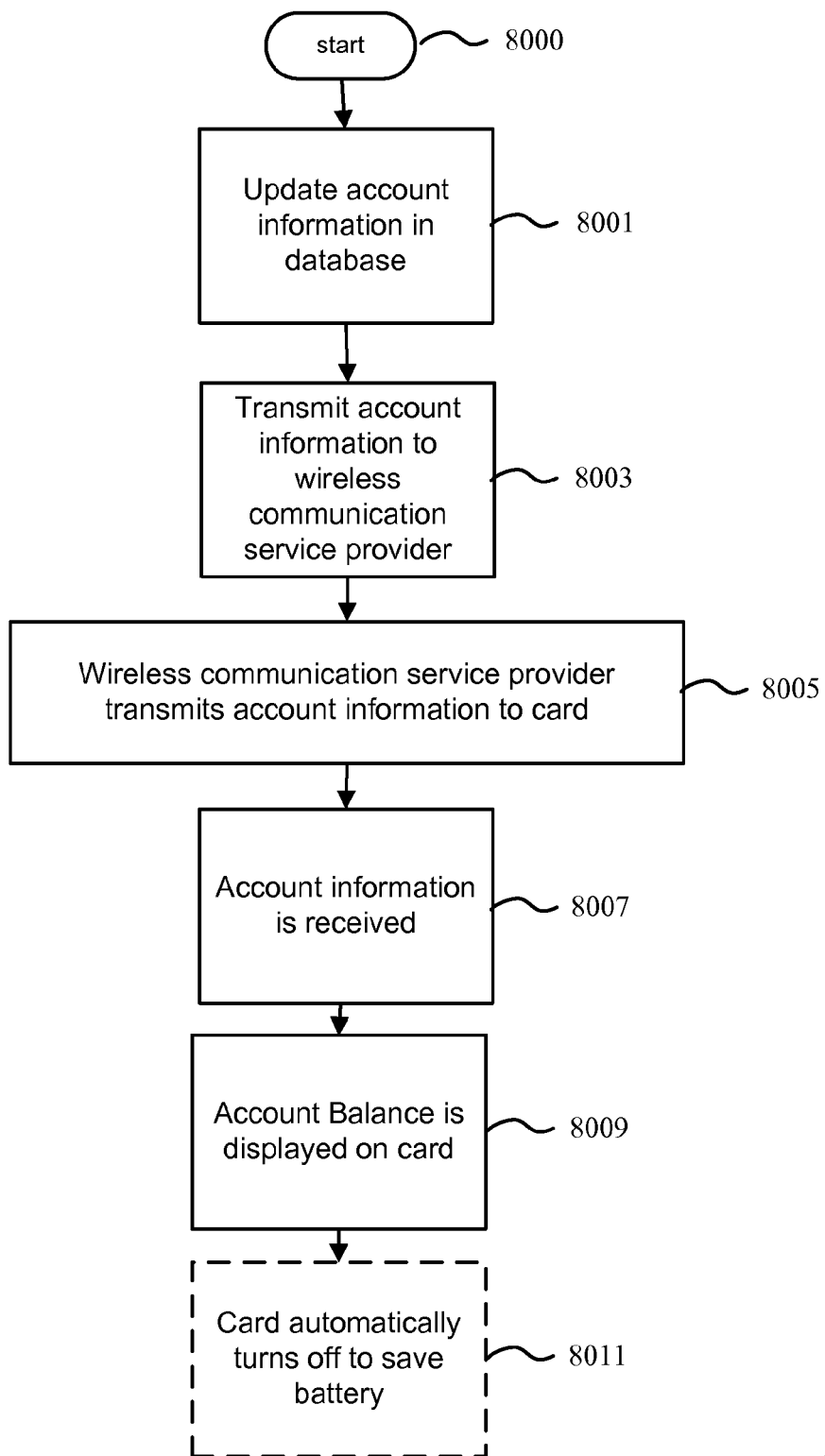
FIG. 20 is a flow diagram illustrating an example operational process in which the wirelessly updated vehicle identification card of FIG. 15 is updated utilizing a long range wireless network.

FIG. 20 illustrates an example operational flow chart 8000 that depicts aspects of the present disclosure. Operation 8001 illustrates updating an insurance institution's database with information related to a user account. These updates may be made, for example, by utilizing point of sale transaction terminals that are currently in use in most retail stores that handle credit/debit transactions. Or, in the same, or another embodiment, the update may be some other activity that affects the balance of an account, i.e., the update may be a deposit or other payments made. A specific example of how a point of sale terminal is utilized in aspects of the present disclosure may include one or more credit card readers that can access the account information stored within the card when the user makes a purchase. Information related to the transaction can then be sent through one or more networks to the issuer of the card, or to a processing center that is configured to authorize credit/debit transactions for one or more financial institutions. The database may include one or more programs, or modules, for determining when to authorize charges to the account and one of these programs or modules may be invoked to determine whether or not to authorize or deny the transaction. In the event that the transaction is authorized, the financial institution 7001 may then transmit an authorization message back through the network to the (POS) terminal and a receipt can be printed for the user. In accordance with at least one embodiment of the present disclosure, one or more programs or modules may monitor transaction activity of the user's account, and update the user's account to reflect the transaction, i.e., in a debt card scenario, the account of the user may be debited, and in a credit card scenario the available balance of the card may be updated.

As illustrated by operation 8003, in this example embodiment, after the user account is updated with information related to the transaction, the insurance institution 7001 can transmit a signal indicative of the account information to the cellular service provider 7015. For example, the financial institution 7001 may be affiliated with one or more cellular providers and the financial institution 7001 can transmit one or more packets of information indicative of the balance in a user's account to the cellular provider's network operations center. A specific example of what information can be transmitted may include sending a signal that identifies that the transaction has taken place, i.e., if a user with an account balance of $1000.00 makes a purchase of $600.00 with their VIN card, once the user's account in the database is updated with information indicative of the transaction, a signal indicative of the new balance, in this example $400.00, can be transmitted to the cellular tower 7010. Another specific example may include, but is not limited to, an insurance institution 7001 transmitting a signal indicative of the current transaction instead of the resulting balance to the cellular tower 7010. In this embodiment, the card 3000 may contain a record of the user's transactions, and the card 3000 may use an adding/subtracting function of the CPU of the card 3000 to modify the transaction record stored within the card 3000 to obtain the account's current balance. While two different specific examples of operation 8003 are disclosed, one skilled in the art will appreciate that these are exemplary and that other types of information may be transmitted in operation 8003.

Once the long range signal service provider 7015 receives the account information, it can be transmitted to the card as illustrated by operation 8005. The account information (possibly encrypted) can be sent to address of the card 3000. For example, the card 3000 may include information that identifies it to the wireless network it is in communication with. In the example where the wireless network is a cellular network, the card 3000 may have been previously assigned a number by the long range signal provider 7015 that is stored in a database along with an association relating it to the number to the account of the user maintained by the financial provider, i.e., a database table may associate account "1234 1234 1234 1234" to phone number "555-555-5555." In some embodiments, once the account information is received by the long range signal service provider 7015, it may wirelessly transmit the information to the card 3000 as depicted by operation 8007. In this situation, the long range signal service provider 7015 may transmit the information at predetermined intervals, for example, after the card 3000 transmits a packet of information indicative of a request for the account information, or the account information can be pushed to the card as soon as it receives the information and identifies where the card is in the network, i.e., by sending a location update request to the card 3000.

In at least one other embodiment of the present disclosure, the account information may be transmitted to the card 3000 when the RF module 3201 is activated. In this embodiment of operation 8007, the card 3000 user turns on/activates the RF module 3201 in order to receive the account information. This activation may be accomplished by, for example, touching the biometric input area 3007 (or an alternative input area, i.e., transmit/receive button) of the card 3000. In this example, after the user touches the biometric input area 3007 the RF module may connect with the cell tower 7010 to receive the account balance.

As illustrated in operation 8009, the account information can then be displayed on the screen(s). The information displayed may be, for example, account balance, status, recent transaction information, advertisements, a graphic image, any other alert or message, or any combination of these items. This information may also be stored in memory on the card for buffering or for a variety of future uses such as to compare old data with new data being received. In some embodiments, the card 3000 may automatically turn off as illustrated by optional operation 8011 via a timer to save battery and/or for security purposes.

Figure 21:
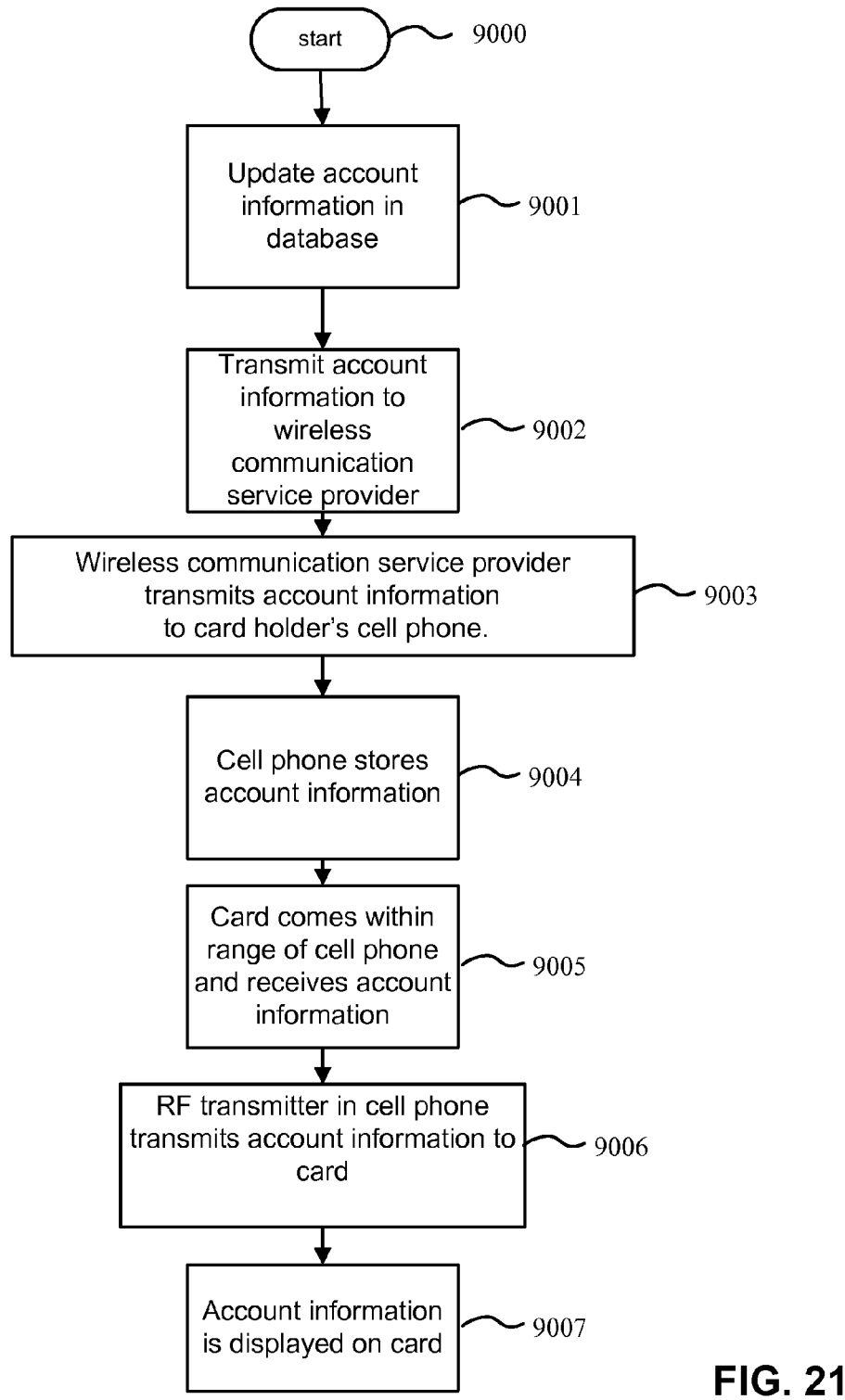
FIG. 21 is a flow diagram illustrating an example process in which the wirelessly updated vehicle identification card of FIG. 15 is updated utilizing a mobile device.

FIG. 21 illustrates an example operational flow chart in which the wirelessly updated VIN card of FIG. 15 is updated via a card holder's cellular phone 7012. As depicted by operation 9001, a financial institution's database is updated with card account information similar to that described above with respect to operation 8001. This account information is transmitted 9002 to a wireless communication service provider. This may be a long range signal service provider 7015, for example. As shown by operation 9003, the long range signal service provider 7015 can then start transmitting (possibly encrypted) account information to the specific phone number of the cellular phone 7012 or other portable wireless digital device of the account holder. As shown by operation 9004, the cell phone can then store the account information in, for example, memory of the cellular phone 7012 such as RAM, and then the transceiver (not shown) in the cell phone 7012 can start transmitting the encrypted account information to the card 3000 once the phone and the card are connected to each other as illustrated by operation 9005 and 9006. For example, in some embodiments of the present disclosure, the cellular phone 7012 may include an RFID reader for example. In this embodiment the card may include a passive, or active, RFID tag that is configured to be reprogrammed with information transmitted by the phone when a RFID tag comes within range of the cell phone's RFID tag reader (not shown). Another specific example may include both the cellular phone of the user and the card including Bluetooth adapters. In this example, when the card comes in close range of the phone, the two Bluetooth adapters may connect and the phone may transmit the account information to the card. This account information is then displayed 9007 on the card 3000, when, for example, the user activates their card by placing their finger on the biometric reader 3007.

Figure 22:
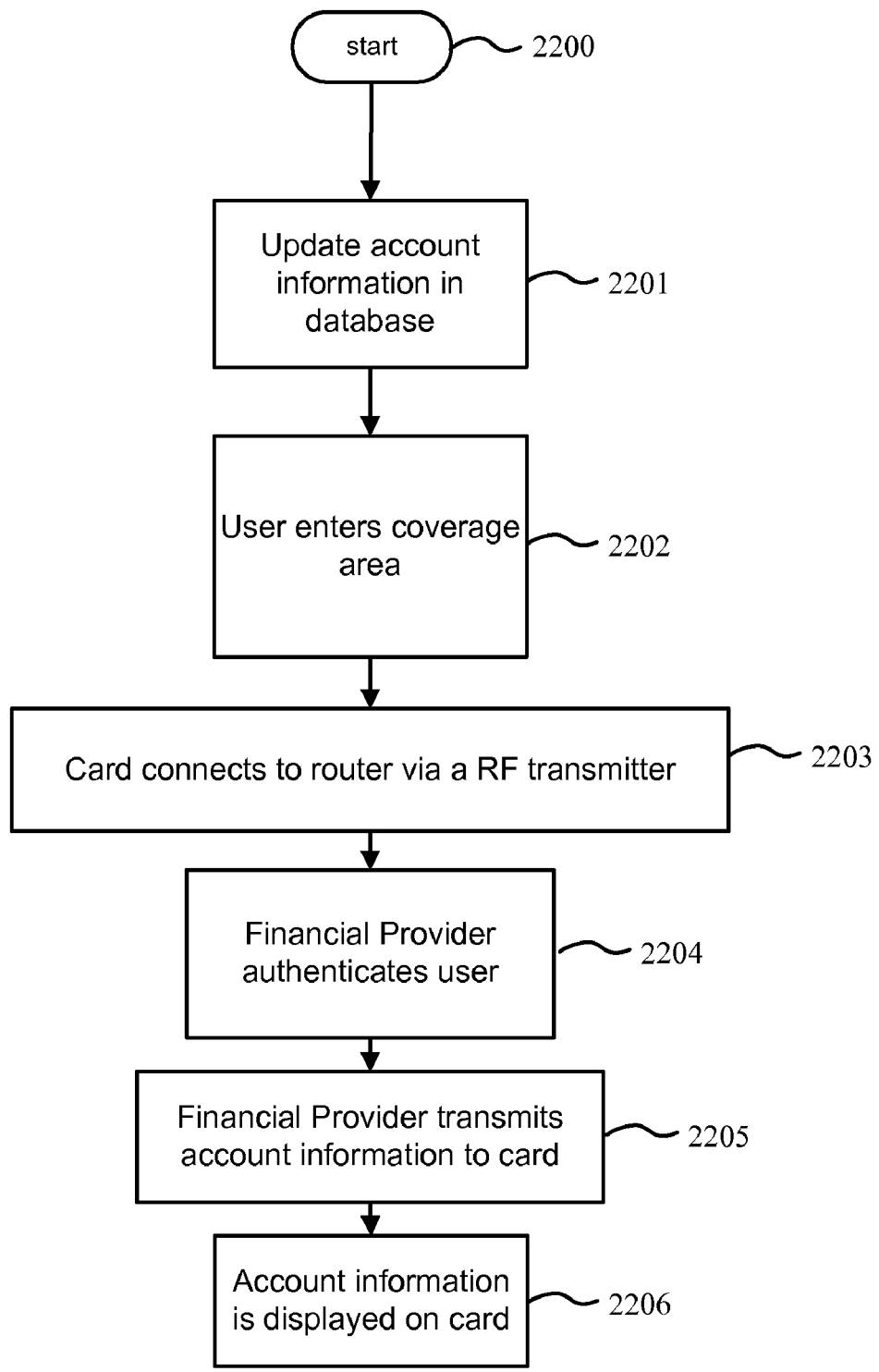
FIG. 22 is a flow diagram illustrating an example operational process in which the wirelessly updated vehicle identification card of FIG. 15 is updated utilizing a wireless network.

FIG. 22 depicts an operational flow chart illustrating an example operational process in which the wirelessly updated VIN card of FIG. 15 is updated via, for example, a WiFi, WiMAX, or other local area or metropolitan area computer network. First, the financial institution's 7001 database is updated 2201 with card account information similar to that described above with respect to operation 8001. As illustrated by operation 2202, the user may enter an area that includes coverage provided by one or more routers utilizing technology such as WiMax, or WiFi. Then, as shown by operation 2203, the card 3000, can connect to such a network and transmit one or more packets of information indicative of a request to access the user's account and receive the user's balance. In some embodiments, this may be accomplished by providing the card 3000 with hardware, software, or firmware configured to connect to any available public network and submit a http, or secure http, request to the router associated with the WiMax or WiFi router in the coverage area. The router can then submit the request to an internet service provider (ISP) wherein the ISP may route the request to one or more other ISPs until the request arrives at a server maintained by the financial provider 7001. As shown by operation 2204, the user can be validated by the financial provider 7001. In response, the server may transmit one or more packets of information indicative of account information back throughout the system to the card 3000 as shown by operation 2205, and thereafter the available balance of the user may be displayed on the screen 3001 of the card 3000 as illustrated by operation 2206.

Figure 23:
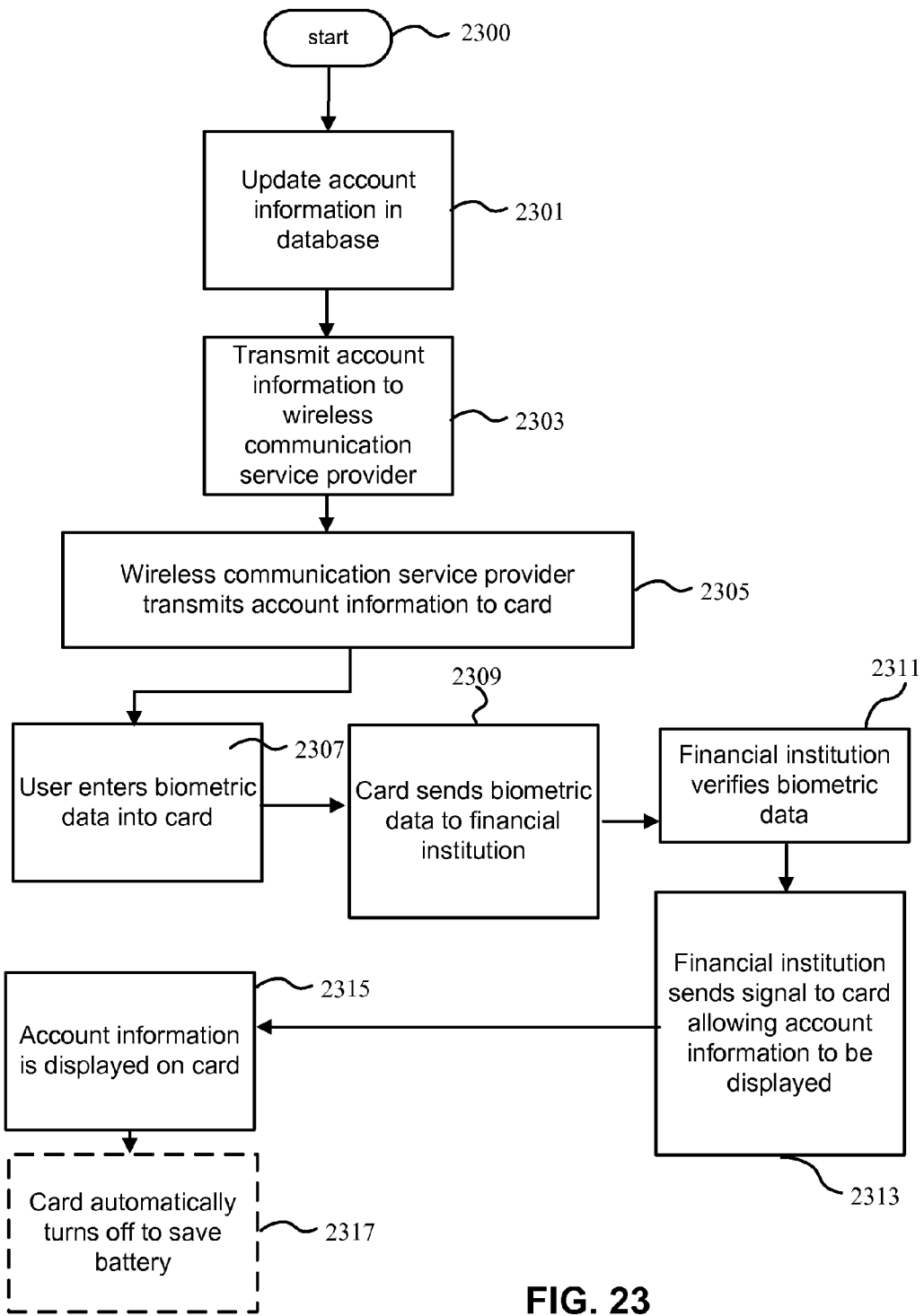
FIG. 23 is a flow diagram illustrating an example process in which the wirelessly updated vehicle identification card of FIG. 15 utilizes biometric security features.

FIG. 23 depicts an operational flow chart illustrating aspects of the present disclosure including biometric security features. In some embodiments of the present disclosure, instead of continuously displaying the information in the display, the screen may display information when the user is authenticated. This reduces the likelihood that an unauthorized user will obtain the card number or the balance of the account, for example. In this example, the financial institution's 7001 database is updated 2301 with card account information. This updated account information is transmitted 2303 to a long range signal service provider 7015, or in other embodiments accessible through an internet connection provided by a WiMAX network for example. As depicted by operation 2305, the long range signal service provider 7015 can transmit (possibly encrypted) account information to the specific phone number/or network address of the card 3000. At some point, the card user can turn on/activate 2307 the card 3000 to receive the account information through the wireless transceiver 3201 in the card 3000. This activation may be accomplished, for example, by touching the biometric input area 3007 (or an alternative input area) of the card 3000, The biometric data captured by the biometric reader (e.g., thumbprint reader 3205) can then be stored, for example, temporarily on the card memory module 3203. The card can then send 2309 biometric data via the long range signal service provider 7015, or the internet connection maintained by a router(s) 7020 associated with a local area network to the financial institution 7001. The financial institution 7001 can then verify 2311 the biometric data (the card holder having previously provided their biometric data to the financial institution for security purposes). The financial institution can then send 2313 a signal to the card 3000 via the long range long range signal service provider 7015 for example, to allow account information to be displayed. The received account information is then displayed 2315 on the display 3001. The information received and/or displayed on the display 3001 may be, for example, account balance, status, recent transaction information, advertisements, a graphic image, any other alert or message, or any combination of these items. This information may also be stored in memory on the card for buffering or for a variety of future uses such as to compare old data with new data being received. Optionally, the card 3000 may automatically turn off 2317 via a timer used by the card processor 3104 to save battery and/or for security purposes.

Figure 24:
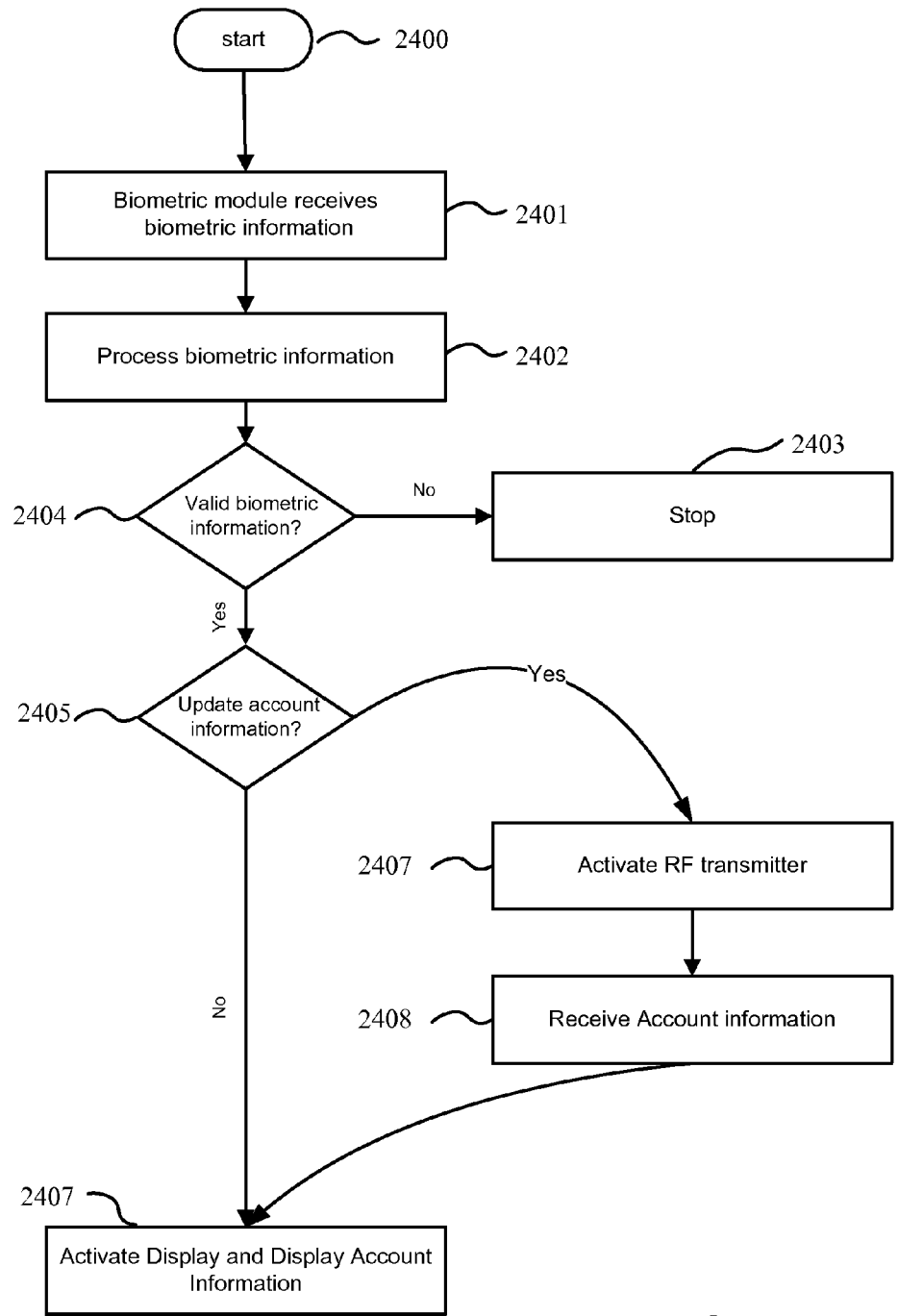
FIG. 24 is a flow diagram illustrating an example process in which the wirelessly updated vehicle identification card of FIG. 15 utilizes biometric security features.

Operational flow 2400 of FIG. 24 illustrates an example operational flow that depicts biometric security features of the present disclosure. For example, as illustrated by FIG. 22, operation 2401 illustrates a user entering their biometric information. As discussed earlier, biometric information may include, but is not limited to, the user's thumbprint, voice profile, facial features, or any other biometric information. As shown by operation 2402, the biometric receiver on the card 3000 may receive the information and, in some embodiments, process the information utilizing the card's 3104 microprocessor in order to determine if the user is authorized. For example, when the card 3000 is issued to the user, the issuer (the financial services provider 7001) may capture the thumbprint or take a picture of the user. In this example, the image of the print or user can be digitized and stored in the card's memory 3203, i.e., in nonvolatile read only memory. When the information is received by the biometric receiver 3205 it may process (utilizing the processor 3104) the information and attempt to match the received image to the image stored in memory 3203 using a matching algorithm or technique as shown by operation 1202. As shown by operation 2404, in the event that the user is authorized, i.e., the biometric information of the user matches the stored digital file, the display 3001, 3002, 3003, etc. of the card may be energized and display any information otherwise the operational procedure may stop at 2403. As illustrated by operation 2405, some information may not need to be updated such as the account number, expiration date, user's signature, etc. This type of information may be immediately displayed in the screen in operation 2406. Other type of account information, such as the available balance of the user may need to be updated before it can be displayed. In this situation, the RF transceiver 3201 of the card can be activated at 2407 and the updated account information may be received at 2408 before being displayed to the user The foregoing detailed description has set forth various embodiments of the systems and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof.

The various systems, methods, and techniques described herein may be implemented with hardware or software or, where appropriate, with a combination of both. Thus, the methods and apparatus of the present disclosure, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. In the case of program code execution on programmable computers, the computer will generally include a processor, a storage medium readable by the processor (including volatile and non-volatile memory and/or storage elements), at least one input device, and at least one output device. One or more programs are preferably implemented in a high level procedural or object oriented programming language to communicate with a computer system. However, the program(s) can be implemented in assembly or machine language, if desired. In any case, the language may be a compiled or interpreted language and combined with hardware implementations.

The methods of the present invention may also be embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, a video recorder or the like, the machine becomes an apparatus for practicing the disclosure. When implemented on a general-purpose processor, the program code combines with the processor to provide a unique apparatus that operates to perform the functionality of the systems and methods described herein.

While the present invention has been described in connection with the preferred embodiments of the various figures, it is to be understood that other similar embodiments may be used or modifications and additions may be made to the described embodiment for performing the same function of the present invention without deviating there from. Furthermore, it should be emphasized that a variety of computer platforms, including handheld device operating systems and other application-specific hardware/software interface systems, are herein contemplated, especially as the number of wireless networked devices continues to proliferate. Therefore, the present invention should not be limited to any single embodiment, but rather construed in breadth and scope in accordance with the appended claims.

What is claimed:

1. A system for authorizing vehicle based transactions comprising:
    at least one subsystem that maintains a database of accounts, each account associated with a vehicle, said database including credit card accounts and secured available credit accounts;
    at least one subsystem that receives a transaction to debit a secured available credit account, said transaction related to said vehicle and said transaction selectively identifying said secured available credit account related to said vehicle in preference to a credit card account related to said vehicle;
    at least one subsystem that determines whether secured available credit is available from said secured available credit account and authorizes said transaction when secured available credit is available; and
    at least one subsystem that transmits information regarding whether secured available credit is available and whether said transaction has been authorized to a vehicle identification card associated with said vehicle, and said vehicle identification card associated with said secured available credit account and associated with said credit card account.

2. The system of claim 1, further comprising at least one subsystem that determines whether secured available credit is available for a specific service performed for said vehicle.

3. The system of claim 1, further comprising at least one subsystem that determines whether secured available credit is available for a specific entity to perform a service for said vehicle.

4. The system of claim 1, further comprising at least one subsystem that receives a request to approve a transaction and determines whether said transaction is a credit based transaction or a secured available credit based transaction.

5. The system of claim 1, further comprising at least one subsystem that receives a request to authorize a secured available credit transaction from a user's computer system.

6. The system of claim 1, further comprising at least one subsystem that receives a request to authorize a secured available credit transaction from an entity associated with an insurance provider.

7. The system of claim 1, further comprising at least one subsystem that receives accident information related to said specific vehicle, determines secured available credit usable for an accident related transaction, and transmits said secured available credit.

8. A method for authorizing vehicle based transactions, the method carried out by a computing device comprising at least one processor and at least one memory communicatively coupled to said processor, the method comprising:
    maintaining a database of accounts, each account associated with a vehicle, said database of accounts including credit card accounts and secured available credit accounts;
    receiving a transaction to debit a secured available credit account, said transaction related to said vehicle and said transaction selectively identifying said secured available credit account related to said vehicle in preference to a credit card account related to said vehicle;
    determining on said computing device whether secured available credit is available from said secured available credit account and authorizing said transaction when secured available credit is available; and
    transmitting information regarding whether secured available credit is available and whether said transaction was authorized to a vehicle identification card associated with said vehicle, and said vehicle identification card associated with said secured available credit account and associated with said credit card account.

9. The method of claim 8, further comprising determining whether secured available credit is available for a specific service performed for said vehicle.

10. The method of claim 8, further comprising determining whether secured available credit is available for a specific entity to perform a service for said vehicle.

11. The method of claim 8, further comprising receiving a request to approve a transaction and determining whether said transaction is a credit based transaction or a secured available credit based transaction.

12. The method of claim 8, further comprising receiving a request to authorize a secured available credit transaction from a user's computer system.

13. The method of claim 8, further comprising receiving a request to authorize a secured available credit transaction from an entity associated with an insurance provider.

14. The method of claim 8, further comprising receiving accident information related to said specific vehicle, determining secured available credit usable for an accident related transaction, and transmitting said secured available credit.

15. A non-transitory computer readable medium bearing instructions for authorizing vehicle based transactions comprising:
    instructions for maintaining a database of accounts, each account associated with a vehicle said database including credit card accounts and secured available credit accounts;
    instructions for receiving a transaction to debit a secured available credit account, said transaction related to said vehicle and said transaction selectively identifying said secured available credit account related to said vehicle in preference to a credit card account related to said vehicle;

instructions for determining whether secured available credit is available from said secured available credit account and authorizing said transaction when secured available credit is available; and instructions for transmitting information regarding whether secured available credit is available and authorizing said transaction to a vehicle identification card associated with said vehicle, and said vehicle identification card associated with said secured available credit account and associated with said credit card account.

16. The computer readable medium of claim 15, further comprising instructions for determining whether secured available credit is available for a specific service performed for said vehicle.

17. The computer readable medium of claim 15, further comprising instructions for determining whether secured available credit is available for a specific entity to perform a service for said vehicle.

18. The computer readable medium of claim 15, further comprising instructions for receiving a request to approve a transaction and determining whether said transaction is a credit based transaction or a secured available credit based transaction.

19. The computer readable medium of claim 15, further comprising instructions for receiving a request to authorize a secured available credit transaction from a user's computer system.

20. The computer readable medium of claim 15, further comprising instructions for receiving a request to authorize a secured available credit transaction from an entity associated with an insurance provider.

21. The computer readable medium of claim 15, further comprising instructions for receiving accident information related to said specific vehicle, determining secured available credit usable for an accident related transaction, and transmitting said secured available credit.

* * * * *